(12) United States Patent
Sasada et al.

(10) Patent No.: US 9,045,656 B2
(45) Date of Patent: *Jun. 2, 2015

(54) BLACK INK COMPOSITION, INK SET, AND IMAGE FORMING METHOD

(75) Inventors: Misato Sasada, Kanagawa (JP); Toshihiro Kamada, Kanagawa (JP); Jun Matsumoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 235 days.

This patent is subject to a terminal disclaimer.

(21) Appl. No.: 13/596,779

(22) Filed: Aug. 28, 2012

(65) Prior Publication Data

US 2013/0050366 A1 Feb. 28, 2013

(30) Foreign Application Priority Data

Aug. 29, 2011 (JP) ................... 2011-186610

(51) Int. Cl.
*B41J 2/01* (2006.01)
*C09D 11/101* (2014.01)
*B41J 2/21* (2006.01)
*C09D 11/322* (2014.01)
*C09D 11/324* (2014.01)
*C09D 11/40* (2014.01)
*C09D 11/54* (2014.01)

(52) U.S. Cl.
CPC ............. *C09D 11/101* (2013.01); *B41J 2/2107* (2013.01); *C09D 11/322* (2013.01); *C09D 11/324* (2013.01); *C09D 11/40* (2013.01); *C09D 11/54* (2013.01)

(58) Field of Classification Search
CPC ............. B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ......... 347/100, 95, 96, 101, 102, 105, 88, 99, 347/21, 20; 106/31.6, 31.27, 31.13; 523/160, 161
See application file for complete search history.

(56) References Cited

U.S. PATENT DOCUMENTS

| | | | |
|---|---|---|---|
| 2002/0064603 A1* | 5/2002 | Noguchi | 427/466 |
| 2004/0127601 A1 | 7/2004 | Sano et al. | |
| 2005/0250869 A1* | 11/2005 | Claes et al. | 522/71 |
| 2006/0004116 A1 | 1/2006 | Kishi et al. | |
| 2008/0017066 A1* | 1/2008 | Bauer et al. | 106/31.6 |
| 2009/0085996 A1* | 4/2009 | Kasai | 347/100 |
| 2011/0025753 A1 | 2/2011 | Yanagi et al. | |
| 2011/0249055 A1* | 10/2011 | Sasada et al. | 347/20 |

FOREIGN PATENT DOCUMENTS

| | | | | |
|---|---|---|---|---|
| CN | 1504522 A | | 6/2004 | |
| CN | 1918249 A | | 2/2007 | |
| CN | 101987930 A | | 3/2011 | |
| JP | 2000345079 A | | 12/2000 | |
| JP | 2004-027211 A | | 1/2004 | |
| JP | 2005-178331 A | | 7/2005 | |
| JP | 3859109 B2 | | 12/2006 | |
| JP | 2008239928 A | | 10/2008 | |
| JP | 2010084066 A | | 4/2010 | |
| JP | 2011074143 A | * | 4/2011 | B41J 2/01 |

OTHER PUBLICATIONS

Notice of Reasons for Rejection, dated Sep. 3, 2013, issued in corresponding JP Application No. 2011-186610, 7 pages in English and Japanese.
Notice of Reasons for Rejections dated Oct. 29, 2014, issued in corresponding CN Application No. 201210310427.2.

\* cited by examiner

*Primary Examiner* — Manish S Shah
(74) *Attorney, Agent, or Firm* — Sughrue Mion, PLLC

(57) ABSTRACT

A black ink composition is provided which suppresses change in hue and can form an image with superior blocking resistance and scratch resistance. The black ink composition for ink jet recording includes a carbon black pigment; at least any one type of colorant pigment which is selected from a magenta pigment and a cyan pigment; a water-soluble polymerizable compound; a polymerization initiator; and water, wherein the average primary particle diameter of the carbon black pigment is 20 nm or more and less than 35 nm, the content ratio of the carbon black pigment with regard to the total mass of all of the pigments is 70 mass % or less, and the total mass of all of the pigments with regard to the total mass of the black ink composition is 4 mass % or less.

15 Claims, No Drawings

BLACK INK COMPOSITION, INK SET, AND IMAGE FORMING METHOD

BACKGROUND OF THE INVENTION

1. Field of the Invention

The present invention relates to a black ink composition, an ink set, and an image forming method.

2. Description of the Related Art

An ink jet technique is applied as an image recording method where a color image is recorded in the field of office printers, home printers, and the like. A pigment is widely used as a colorant of an ink component which is used in ink jetting, and among these, as black ink, carbon black is frequently used.

In an ink composition using carbon black pigment, a hue of black ink can be improved by using a colorant pigment in addition to a carbon black pigment (for example, refer to JP3859109B).

In addition, as an ink jet recording ink, ultraviolet curing pigment ink has been developed (for example, refer to JP2004-027211A and JP2005-178331A). The ultraviolet curing pigment ink basically contains a pigment, a polymerizable compound, and a polymerization initiator. In a case where the ultraviolet curing pigment ink is black, carbon black pigment is generally used as the pigment.

SUMMARY OF THE INVENTION

However, in an image formed using an aqueous ink which contains a carbon black pigment, a polymerizable compound, and a polymerization initiator, there are cases where blocking resistance and scratch resistance are deteriorated and cases where the change in hue is increased.

The present invention takes the above into consideration and provides a black ink composition, an ink set, and an image forming method where an image can be formed with superior blocking resistance and scratch resistance so that change in hue is suppressed.

The present inventors have obtained the knowledge that change in hue of an image is suppressed and blocking resistance and scratch resistance of an image are improved by, with regard to a black ink composition which contains a carbon black pigment, a polymerizable compound, a polymerization initiator, and water, at least any one type of colorant pigment which is selected from a magenta pigment and a cyan pigment being contained and the average primary particle diameter of the carbon black pigment, the content ratio of the carbon black pigment in all of the pigments, and the total mass of all of the pigments in the black ink composition being specified, and the present invention has been completed based on this knowledge.

That is, the black ink composition of the present invention which is able to solve the problems above contains a carbon black pigment, at least any one type of colorant pigment which is selected from a magenta pigment and a cyan pigment, a water-soluble polymerizable compound, a polymerization initiator, and water, where the average primary particle diameter of the carbon black pigment is 20 nm or more and less than 35 nm, the content ratio of the carbon black pigment with regard to the total mass of all of the pigments is 70 mass % or less, and the total mass of all of the pigments with regard to the total mass of the black ink composition is 4 mass % or less.

Preferably, at least a portion of surface of the carbon black pigment and the at least one type of the colorant pigment are covered by a resin which has a salt-forming group.

Also, preferably, the water-soluble polymerizable compound contains a multifunctional polymerizable compound and a monofunctional polymerizable compound which has a (meth)acrylamide structure.

Also, preferably, the content ratio of the monofunctional polymerizable compound is 20 mass % or more and 80 mass % or less with regard to the total mass of the water-soluble polymerizable compound.

Also, preferably, the resin having salt-forming group is cross-linked by a cross-linking agent.

Also, preferably, the resin having salt-forming group has at least one type of aromatic ring structure and alicyclic structure.

Also, preferably, the polymerization initiator is a compound represented by the following general formula (1).

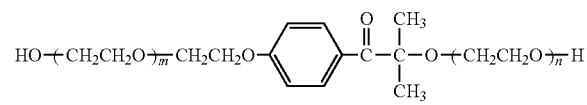

In general formula (1), m and n each independently represent an integer of 0 or more and m+n represents an integer of 0 to 3.

Also, preferably, an acetylene glycol-based surfactant is further included.

Also, preferably, the total mass of all of the pigments with regard to the total mass of the black ink composition is 1.8 mass % or more.

Also, preferably, the content ratio of the carbon black pigment with regard to the total mass of all of the pigments is 50 mass % or more.

The ink set of the present invention includes the black ink composition of the present invention and a processing liquid which includes an aggregating agent which can aggregate the black ink composition by coming into contact with the black ink composition.

Preferably, the flocculant is an acidic compound.

More preferably, the ink set of the present invention comprises a black ink composition containing a carbon black pigment, a magenta pigment, a cyan pigment, a water-soluble multifunctional polymerizable compound, a water-soluble monofunctional polymerizable compound having a (meth)acrylamide structure, a polymerization initiator, an acetylene glycol-based surfactant, and water, a processing liquid containing an acidic compound being able to aggregate the black ink composition by coming into contact with the black ink composition, wherein the average primary particle diameter of the carbon black pigment is 20 nm or more and less than 35 nm, the content ratio of the carbon black pigment with regard to the total mass of all of the pigments is 70 mass % or less, the total mass of all of the pigments with regard to the total mass of the black ink composition is 1.8 mass % or more to 4 mass % or less, and at least a portion of surface of the carbon black pigment, the magenta pigment and the cyan pigment are covered by a resin having a salt-forming group cross-linked by cross-linking agent and an aromatic ring structure.

The image forming method of the present invention using the ink set of the present invention comprises adding processing liquid for adding a processing liquid onto a recording medium, adding ink for adding a black ink composition onto the recording medium, and curing image for curing an image by irradiating active energy ray to the image, which is formed by the adding processing liquid and the adding ink.

According to the present invention, it is possible to provide a black ink composition, an ink set, and an image forming method capable of forming image suppressing change in hue and having superior blocking resistance and scratch resistance.

DESCRIPTION OF THE PREFERRED EMBODIMENTS

Below, embodiments of the present invention will be described in detail, but the present invention is not limited thereto and various modification can be realized in the range of the gist thereof.

In the specifications, a numerical range represented using "to" has the meaning of a range which includes the numerical values which are written before and after the "to" as the lower limit and the upper limit.

[Black Ink Composition]

The black ink composition of the present invention (referred to simply below as the "ink composition" or the "ink") is a black ink composition for ink jet recording, a black ink composition which contains a carbon black pigment, at least any one type of the colorant pigment which is selected from a magenta pigment and a cyan pigment, a water-soluble polymerizable compound, a polymerization initiator, and water, where the average primary particle diameter of the carbon black pigment is 20 nm or more and less than 35 nm or less, the content ratio of the carbon black pigment with regard to the total mass of all of the pigments is 70 mass % or less, and the total mass of all of the pigments with regard to the total mass of the black ink composition is 4 mass % or less.

According to the ink composition of the present invention, it is possible to form an image suppressing change in hue and blocking and having superior scratch resistance.

The reason that these effects can be obtained is estimated to be as follows.

Typically, when a carbon black pigment is contained in an ink composition containing a polymerizable compound, a polymerization initiator, and water, there is a tendency for polymerization (curing) to be inhibited due to the carbon black pigment. The cause is because the absorbance in a short wavelength region (for example, ultraviolet) is high compared to the absorbance in a long wavelength and the carbon black pigment is easy to adsorb a radical. Furthermore, due to the investigation of the present inventors, it was understood that as the average primary particle diameter of the carbon black pigment get smaller, the absorbance in the short wavelength region further increases and it is easier for the polymerization to be inhibited.

When polymerization is inhibited in the ink composition, the scratch resistance is deteriorated and it is easy for blocking to occur in the forming image.

Here, blocking indicates a phenomenon that, in a case where another recording medium is overlapped on the image which is formed on a recording medium (included when an image is formed on the other recording medium and the images are in contact), the image and the other recording medium become attached and the image receives damage when the other recording medium is peeled off.

The inhibition of the polymerization is considered to have a tendency to be improved to a certain extent by containing at least any one type of the colorant pigment which is selected from a magenta pigment and a cyan pigment in the ink composition in addition with the carbon black pigment.

However, due to the investigation of the present inventors, in the containing of the carbon black pigment and the at least any one type of colorant pigment which is selected from a magenta pigment and a cyan pigment in the ink composition, it was understood that change in the hue in an image occur easily depending on the relationship of the average primary particle diameter of the carbon black pigment and the content ratio of the carbon black pigment and the total mass of all of the pigments.

Here, change in the hue indicates a phenomenon where the hue changes along with a change in the halftone dot density when the halftone dot density of the image changes.

When the change in the hue is large, there are cases where a pale yellowish black color or a pale yellowish intermediate color tone (a grey tone or the like) cannot be obtained as desired.

In addition, as the average primary particle diameter of the carbon black pigment becomes larger, it is difficult for polymerization to be inhibited but it becomes clear that there is a tendency for blocking to easily occur due to the size of the particle diameter of the carbon black pigments itself.

Therefore, in the ink composition of the present invention, with regard to a black ink composition which contains a carbon black pigment, a polymerizable compound, a polymerization initiator, and water, by at least any one type of the colorant pigment which is selected from a magenta pigment and a cyan pigment being contained, the average primary particle diameter of the carbon black pigment being specified as 20 nm or more and less than 35 nm or less, and the range of the content ratio of the carbon black pigment where the average primary particle diameter is 20 nm or more and less than 35 nm and the total mass of all of the pigments being set, the change in hue is suppressed and blocking resistance and scratch resistance are improved in an image which is formed using the ink composition.

<Carbon Black Pigment>

The black ink composition of the present invention contains at least one type of carbon black pigment.

The average primary particle diameter of the carbon black pigment is 20 nm or more and less than 35 nm as described above.

When the average primary particle diameter is less than 20 nm or less, as a result of the absorbing of the short wavelength region being too large, the scratch resistance and the blocking resistance of the image is reduced.

When the average primary particle diameter is 35 nm or more, the change in hue in the image is large and blocking resistance is deteriorated.

The average primary particle diameter in the present invention is measured of the particles diameters (area circle equivalent diameter) of 1000 primary particles which are arbitrarily selected in the picture image which is shot using a transmission electron microscope TEM2010 (pressure voltage of 200 kV) manufactured by JEOL Ltd and calculated as an arithmetic mean thereof. That is, the average primary particle diameter in the present invention represents the arithmetic mean diameter of the particle of the area circle equivalent diameter.

The average primary particle diameter of the carbon black pigment is preferably 22 nm to 33 nm from the point of view of effectively accomplishing the effects of the present invention.

In addition, in the black ink composition of the present invention, there is no particular limits to the volume average secondary particle diameter of the carbon black pigment but 70 nm to 140 nm is preferable from the point of view of hue. Here, the volume average secondary particle diameter can be measured using NANOTRACK particle size distribution measurement apparatus UPA-EX150 (manufactured by Nikkiso Co., Ltd.).

The DBP (dibutyl phthalate) absorption amount of the carbon black pigment is not particularly limited, but 30 ml/100 g or more and 200 ml/100 g or less is preferable and 50 ml/100 g or more and 150 ml/100 g or less is more preferable from the point of view of color tones and the density of the printed image.

Here, the DBP absorption amount is measured using a JIS K6221 A method.

In addition, the BET specific surface area of the carbon black pigment is not particularly limited, but is preferably 30 $m^2/g$ or more and 450 $m^2/g$ or less and is more preferably 200 $m^2/g$ or more and 400 $m^2/g$ or less from the point of view of the density of the printed image and maintenance stability.

As the carbon black pigment, examples include pigments manufactured using a known method such as a contact method, a furnace method, and a thermal method.

Specific examples include Raven1250, Raven1200, Raven1190 ULTRA, Raven1170, Raven1255, Raven1080 ULTRA, Raven1060 ULTRA, Raven1040, Raven1035, Raven1020, Raven1000, Raven900, Raven890, Raven850, and Raven780 ULTRA (all manufactured by Colombian Carbon Corp.), Rega1400R, Rega1330R, Rega1660R, Mogul L, and Black Pearls L (all manufactured by Cabot Corp.), Color Black S160, Color Black S170, Printex35, Printex U, Printex V, Printex140U, Printex140V, Printex300, Special Black 5, Special Black 4A, Special Black4, and Special Black550, Special Black 350, NEROX3500 (all manufactured by Evonik Degussa Co., Ltd), No. 33, No. 40, No. 45, No. 47, No. 52, MA7, MA8, MA11, MA77, MA100, MA230, and MA600 (all manufactured by Mitsubishi Chemical Corp.), and the like. However, the carbon black pigment is not limited thereto.

The carbon black pigment may be used as one type singly or two or more types in combination.

The content ratio of the carbon black pigment in the ink composition of the present invention (the total content ratio in the case of two or more types) is not particularly limited but 0.5 to 4.0 mass % is preferable and 0.8 to 3.5 mass % is more preferable from the point of view of effectively accomplishing the effects of the present invention.

<Colorant Pigment>

In the ink composition of the present invention, at least one type of the colorant pigment which is selected from a magenta pigment and a cyan pigment is contained in addition to the carbon black pigment.

The magenta pigment and the cyan pigment can be appropriately selected from known organic pigments according to the objective. Specific examples of the organic pigments which can be used in the present invention are shown below.

Examples of the magenta pigment include C. I. pigment red 2, C. I. pigment red 3, C. I. pigment red 5, C. I. pigment red 6, C. I. pigment red 7, C. I. pigment red 15, C. I. pigment red 16, C. I. pigment red 48:1, C. I. pigment red 53:1, C. I. pigment red 57:1, C. I. pigment red 122, C. I. pigment red 123, C. I. pigment red 139, C. I. pigment red 144, C. I. pigment red 149, C. I. pigment red 166, C. I. pigment red 177, C. I. pigment red 178, C. I. pigment red 222, C. I. pigment violet 19, and the like.

Out of these, at least any one type selected from C. I. pigment red 122, C. I. pigment red 202, C. I. pigment red 209, and C. I. pigment violet 19, and C. I. pigment red 122 and C. I. pigment violet 19 are particularly preferable from the point of view of adhesion and scratch resistance.

Examples of the cyan pigment include C. I. pigment blue 15, C. I. pigment blue 15:2, C. I. pigment blue 15:3, C. I. pigment blue 15:4, C. I. pigment blue 16, C. I. pigment blue 60, C. I. pigment green 7, a siloxane-crosslinked aluminum phthalocyanine as described in U.S. Pat. No. 4,311,775A and the like.

Out of these, at least any one type selected from C. I. pigment blue 15:3, C. I. pigment blue 15:4, and C. I. pigment blue 16, and at least any one type be selected from C. I. pigment blue 15:3 and C. I. pigment blue 15:4 is particularly preferable from the point of view of adhesion and scratch resistance.

In addition, the ink composition of the present invention may include at least one type of yellow pigment as required in addition to the at least one type of magenta pigment and cyan pigment.

Examples of the yellow pigment includes C. I. pigment orange 31, C. I. pigment orange 43, C. I. pigment yellow 12, C. I. pigment yellow 13, C. I. pigment yellow 14, C. I. pigment yellow 15, C. I. pigment yellow 17, C. I. pigment yellow 74, C. I. pigment yellow 93, C. I. pigment yellow 94, C. I. pigment yellow 128, C. I. pigment yellow 138, C. I. pigment yellow 151, C. I. pigment yellow 155, C. I. pigment yellow 180, C. I. pigment yellow 185, and the like.

Out of these, at least any one type selected from C. I. pigment yellow 74, C. I. pigment yellow 155, and C. I. pigment yellow 185 are preferable from the point of view of adhesion and scratch resistance.

In the present invention, it is preferable that at least one type of magenta pigment and at least one type of cyan pigment are contained as colorant pigments from the point of view of suppressing change in hue and improving adhesion and scratch resistance.

In the present invention, the content ratio of the carbon black pigment with regard to the total mass of all of the pigments is 70 mass % or less. When the content ratio of the carbon black pigment exceeds 70 mass %, the change in hue in the image is large, and in addition, the blocking resistance and the scratch resistance are deteriorated.

In addition, in the present invention, there is no particular limitation with regard to the lower limit of the content ratio of the carbon black pigment, but the lower limit is preferably 50 mass % with regard to the total mass of all of the pigments and is more preferable 60 mass % from the point of view of the hue and the optical density (OD).

In addition, in the present invention, the total mass of all of the pigments with regard to the total mass of the black ink composition is 4 mass % or less.

When the total mass of all of the pigments exceeds 4 mass %, the change in hue is large and the scratch resistance and the blocking resistance are deteriorated.

There is no particular limitation with regard to the lower limit of the total mass of all of the pigments, but the lower limit is preferably 1.5 mass % with regard to the total mass of the black ink composition, is more preferable 1.8 mass %, and is particularly preferable 2.0 mass % from the point of view of further improving the optical density (OD) of the image.

In addition, the mass ratio of the magenta pigment with regard to the total mass of the magenta pigment and the cyan pigment [mass of magenta pigment/(total mass of magenta pigment and cyan pigment)] in a case where both the magenta pigment and the cyan pigment are contained in the ink composition of the present invention is preferably 0.5 to 0.8 and is more preferably 0.5 to 0.7 from the point of view of the hue.

<Resin>

In the present invention, it is preferable that at least a portion of the surface of each of the carbon black pigment and the at least one type of the colorant pigment (referred to collectively below as "pigments") be covered by a resin from the point of view of dispersion stability. Below, the pigment where at least a portion of the surface thereof is covered by the resin is referred to as "resin covered pigment".

Examples of the resin include polyvinyls, polyurethanes, polyesters, and the like and out of these, polyvinyls are preferable.

In addition, the resin preferably has a salt-forming group from the point of view of dispersion stability.

Examples of the salt-forming group include an anionic group (referred to below as "acidic group") and the cationic group, and more specific examples include a carboxyl group, a sulfo group, a phosphonate group, an amino group, an ammonium group, and the like.

As the salt forming group, an acidic group (for example, a carboxyl group, a sulfonate group, or a phosphate group) is preferable, and out of these, a carboxyl group is particularly preferable.

In addition, the resin is preferably a resin which is soluble in water (referred to below as "water-soluble resin") from the point of view of dispersion stability.

Here, "water-soluble" in the resin has the meaning of 2 mass % or more of the resin being dissolved in distilled water at 25° C., and the dissolving of 5 mass % or more is preferable and the dissolving of 10 mass % or more is more preferable. In addition, in a case where the resin has the salt-forming group (for example, an acidic group), the solubility in a case where there is a state of being neutralized by an equimolar of a base or an acid is preferably in the range described above.

Examples of the water-soluble resin include a hydrophilic polymer compound. Out of the hydrophilic polymer compounds, a water-soluble resin dispersion agent which disperses carbon black in an aqueous medium is preferable.

In addition, in the present invention, the resin having the salt-forming group which covers the pigment is preferably cross-linked by a cross-linking agent from the point of view of dispersion stability.

In this case, the resin preferably has a functional group which is able to cross-link using a cross-linking agent.

Examples of the functional group which is able to cross-link include the salt-forming groups described above (for example, a carboxyl group), an isocyanate group, an epoxy group, and the like, and a carboxyl group is particularly preferable from the point of view of improving dispersion.

The pigment with the format of being covered by the resin having salt-forming group and the resin being cross-linked due to the cross-linking agent (referred to below as "cross-linked resin covered pigment") is, for example, can be prepared as a resin covered pigment by a pigment being dispersed using a resin which has a salt-forming group, and after that, prepared by the resin covered pigment being cross-linked using the cross-linking agent.

Specifically, the resin covered pigment is, for example, able to be prepared using a manufacturing method including (i) a step where the pigment, the water-soluble resin (dispersing agent), the aqueous solution which contains a basic substance, and an organic solvent which can dissolve or disperse the water-soluble resin are mixed and dispersed (mixing and hydration step) and (ii) a step where at least a portion of the organic solvent is removed (solvent removal step).

The cross-linked resin covered pigment is able to be prepared using, for example, a manufacturing method further including (iii) a step where the cross-linking agent is added to the dispersant, which is obtained due to the dispersion described above, and heated and the water-soluble resin is cross-linked (cross linking step) and (iv) a step where impurities are removed by refining the dispersant after cross linking (refining step) between the steps (i) and (ii).

Due to (i) to (iv), a pigment dispersant, where the pigment is finely dispersed and the storage stability is superior, can be prepared.

More specifically, for example, the resin covered pigment where at least a portion of the surface thereof is covered by the water-soluble resin can be prepared using a method disclosed in JP2009-190379A.

In addition, the resin having salt-forming group preferable has at least one type of an aromatic ring structure or an alicyclic (referred to below as "aliphatic ring") structure from the point of view of dispersion stability.

In particular, in the ink composition, in regard to only a case where the resin having salt-forming group is not cross linked, it is more preferable that all of the resin which covers the carbon black pigment and the at least one type of the colorant pigment have an aromatic ring structure from the point of view of dispersion stability.

As the resin which has at least one type of an aromatic ring structure or an alicyclic structure and having salt-forming group, specifically, is a preferable resin, which contains a repeating unit represented by the following general formula (a) and a repeating unit which has a salt-forming group (referred to below as "specified resin").

(Repeating Unit Represented by General Formula (a))

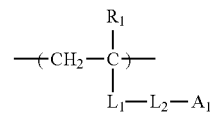

General Formula (a)

In the general formula (a), $R_1$ represents a hydrogen atom, a methyl group or a halogen atom (for example, a chlorine atom, a bromine atom, or an iodine atom), $L_1$ represents *—COO—, *—OCO—, *—CONR$_2$—, *—O—, or a substituted or unsubstituted phenylene group, $R_2$ represents a hydrogen atom or an alkyl group with 1 to 10 carbon atoms. Here, the * mark in the group represented by $L_1$ represents an atomic bond which links with a main chain. $L_2$ represents a single bond or a divalent linking group. $A_1$ represents a monovalent group which is derived from an aromatic ring or an aliphatic ring.

In the general formula (a), $R_1$ represents a hydrogen atom, a methyl group or a halogen atom and preferably represents a methyl group.

In the general formula (a), $L_1$ represents *—COO—, *—OCO—, *—CONR$_2$—, *—O—, or a substituted or unsubstituted phenylene group, and in a case where $L_1$ represents a phenylene group, an unsubstituted phenylene group is preferable. As $L_1$, *—COO— is particularly preferable.

In the general formula (a), $R_2$ represents a hydrogen atom or an alkyl group with 1 to 10 carbon atoms.

$L_2$ represents a single bond or a divalent linking group. As the divalent linking group, a linking group with 1 to 30 carbon atoms is preferable, a linking group with 1 to 25 carbon atoms is more preferable, a linking group with 1 to 20 carbon atoms is even more preferable, and a linking group with 1 to 15 carbon atoms is particularly preferable.

Out of these, particularly preferable as $L_2$ is a divalent linking group which contains alkylene group such as an alkyleneoxy group with 1 to 20 carbon atoms (more preferably 1 to 10), an imino group (—NH—), or a sulfamoyl group, or a divalent group including an alkylene group such as an alkylene group with 1 to 20 carbon atoms (more preferably 1 to 15) or an ethyleneoxyde group [—(CH$_2$CH$_2$O)$_n$— where n is an integer of 1 to 6] or a group which combines two or more of these.

Out of these, most preferable as L$_2$ is a single bond, an alkylene group with 1 to 20 carbon atoms (more preferably 1 to 15 and even more preferably 1 to 6) and an ethylene oxide group [—(CH$_2$CH$_2$O)$_n$— where n is an integer of 1 to 6 and  represents a bonding position with A$_1$].

In the general formula (a), A$_1$ represents a monovalent group which is derived from an aromatic ring or an aliphatic ring.

In a case where A$_1$ is a monovalent group which is derived from an aromatic ring, the aromatic ring is not particularly limited and examples thereof include a benzene ring, a condensed aromatic ring with 8 or more carbon atoms, an aromatic ring where a hetero ring is condensed, and an aromatic ring where two or more benzene rings are condensed.

In addition, in a case where A$_1$ is a monovalent group which is derived from an aliphatic ring, the aliphatic ring is not particularly limited and examples thereof include an aliphatic group with 3 to 12 carbon atoms (preferably a cyclohexane ring or an isobornene ring)

The "condensed aromatic ring with 8 or more carbon atoms" is an aromatic compound with 8 or more carbon atoms where a ring is configured from an aromatic ring where at least two or more benzene rings and at least one type of aromatic ring and the aromatic ring have been condensed and an alicyclic hydrocarbon. Specific examples include naphthalene, anthracene, fluorene, phenanthrene, acenaphthene, and the like.

The "aromatic ring where a hetero ring is condensed" is an aromatic compound which does not contain a hetero atom (preferable, a benzene ring) and a compound where a cyclic compound which has a hetero atom is condensed. Here, the cyclic compound which has a hetero atom preferable is a 5-membered ring or a 6-membered ring. As the hetero atom, a nitrogen atom, an oxygen atom, or a sulfur atom is preferable. The cyclic compound which has a hetero atom may have a plurality of hetero atoms. In this case, the hetero atoms may be the same to or different from each other.

Specific examples of the hetero ring where the aromatic ring is condensed include phthalimide, acridone, carbazole, benzoxazole, benzothiazole, and the like.

Specific examples of the monomer which is formed by the repeating unit represented by the general formula (a) can include (meth)acrylates, (meth)acrylamides, styrenes, and vinyl monomers such as vinyl esters.

In the specified resin, the repeating unit represented by the general formula (a) has a structure where the aromatic ring or the aliphatic ring binds with an atom in the main chain through a linking group, in other words, a structure where the aromatic ring or the aliphatic ring does not directly binds with an atom in the main chain. As a result, since an appropriate distance is maintained between the hydrophobic aromatic ring or aliphatic ring and the repeating unit having salt-forming group, it is easy for interaction between the specified resin and the pigment to occur. As such, the dispersion of the pigment is further improved since the specified resin is more strongly absorbed to the pigment.

Specific examples of the monomer which forms the repeating unit represented by the general formula (a) can include the following monomers as the monomer having aromatic ring.

Here, the present invention is not limited thereto.

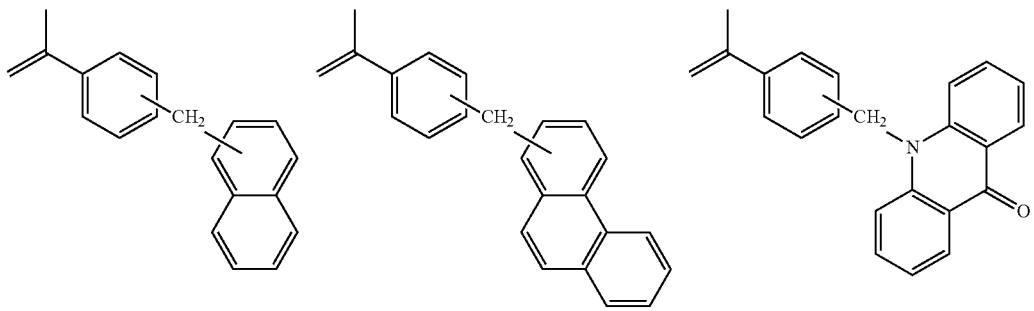

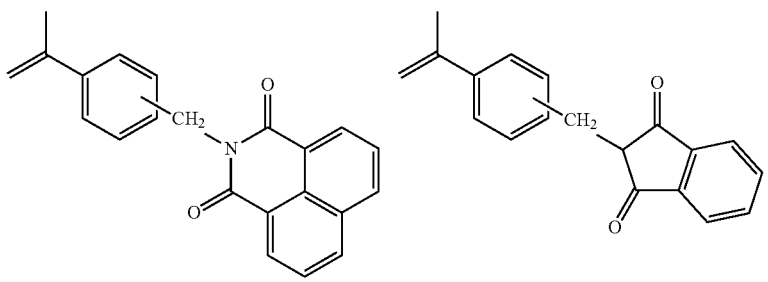

-continued
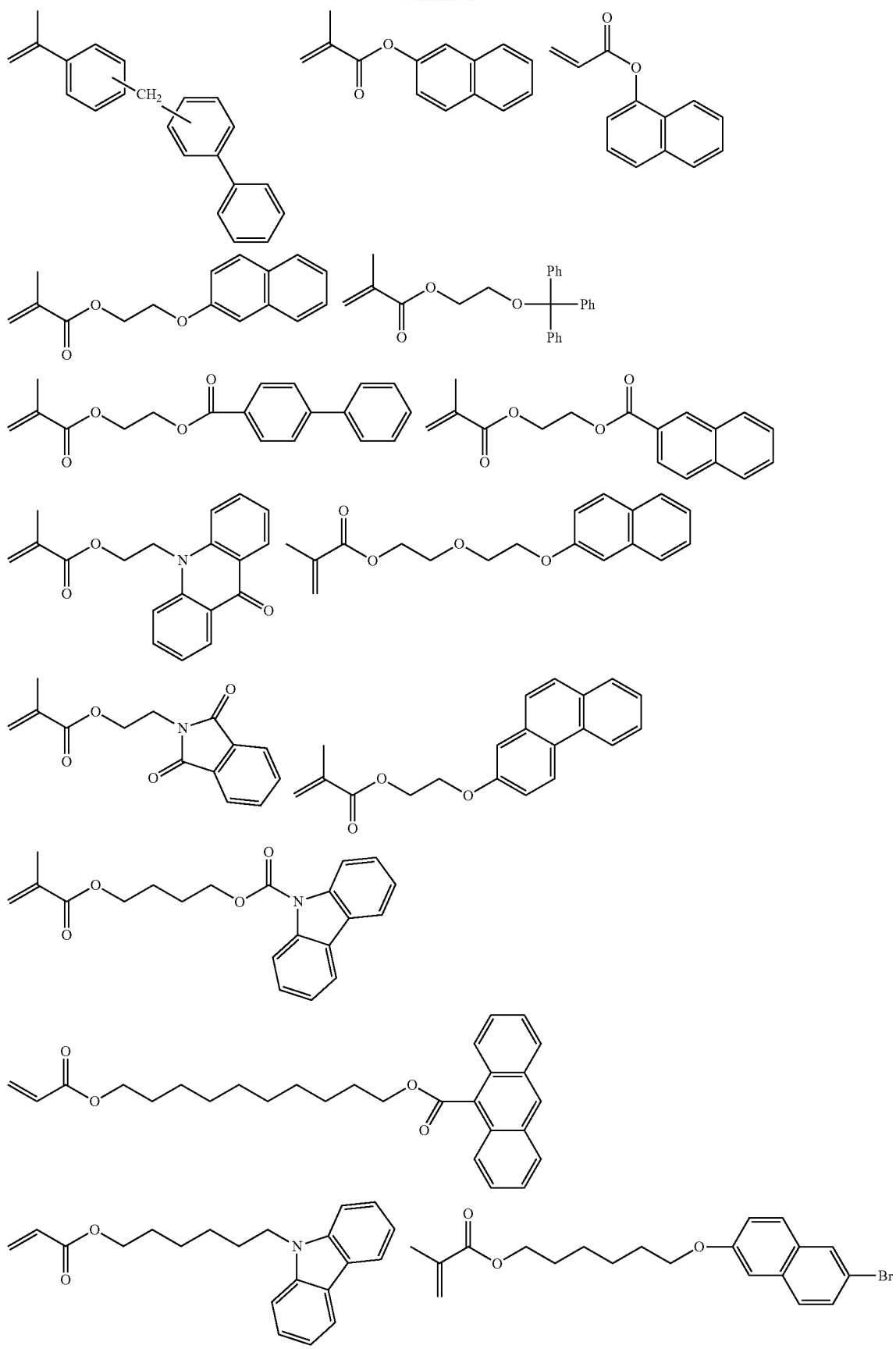

-continued

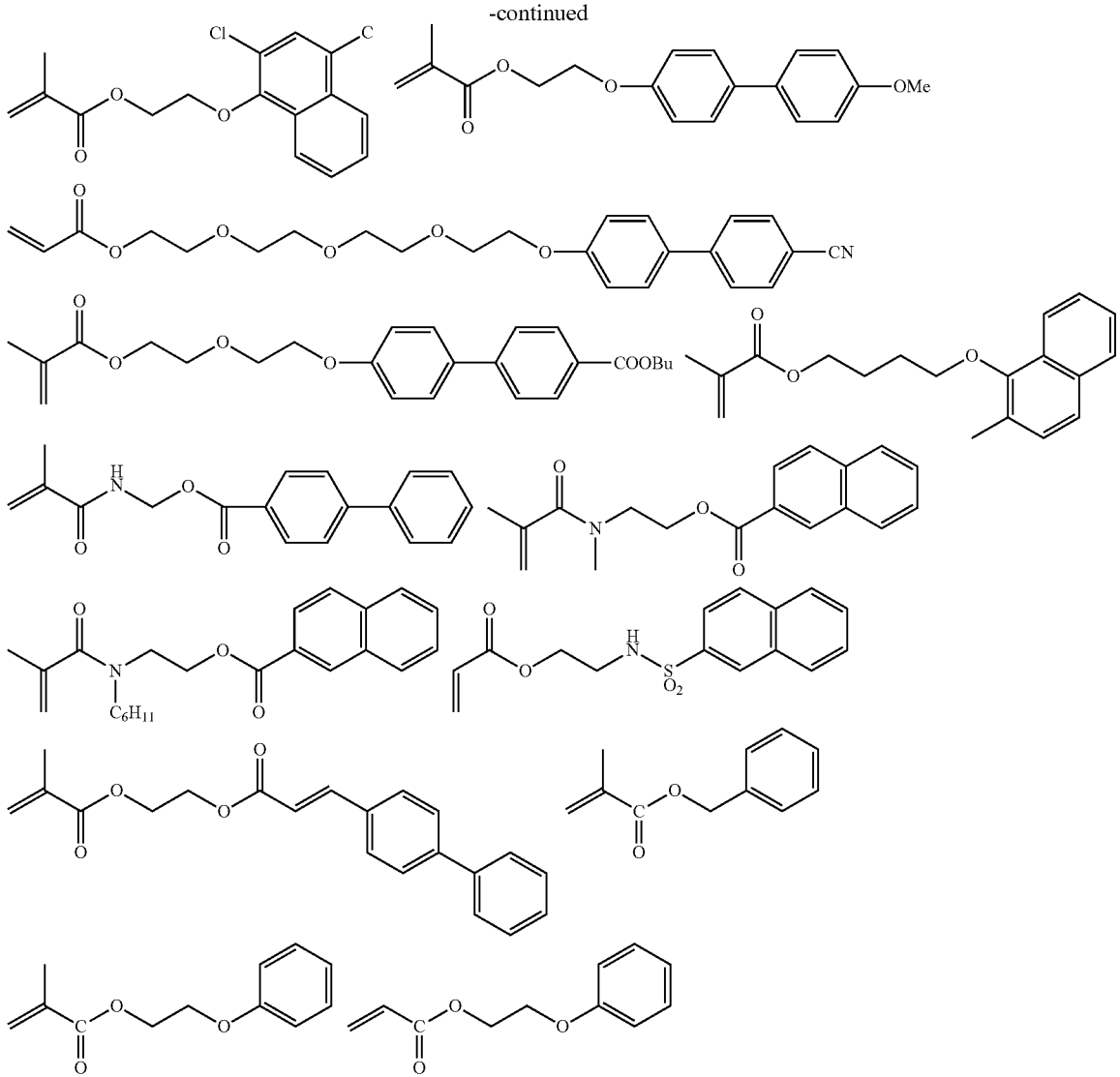

In addition, specific examples of the monomer which forms the repeating unit represented by the general formula (a) include cyclohexyl (meth)acrylate and isobornyl (meth)acrylate as the monomer having aliphatic ring. Here, the present invention is not limited thereto.

As the monomer which forms the repeating unit represented by the general formula (a), benzyl (meth)acrylate, phenoxyethyl (meth)acrylate, cyclohexyl (meth)acrylate, and isobornyl (meth)acrylate are preferable from the point of view of dispersion stability of the pigment which has been covered.

The repeating unit represented by the general formula (a) is able to be used as one type singly or the mixing of two or more groups.

The proportion of the content of the repeating unit represented by the general formula (a) in the polymer is preferably in the range of 20 to 90 mass % with regard to the total mass of the polymer, is more preferably in the range of 45 to 90 mass %, and is particularly preferably in the range of 65 to 90 mass %.

(Repeating Unit Having Salt-Forming Group)

The repeating unit having salt-forming group is preferably a repeating unit which is derived from a salt-forming group containing monomer.

Examples of the salt-forming group containing monomer include a cationic monomer, an anionic monomer, and the like. Examples thereof include the monomers disclosed in page 5, column 7, line 24 to column 8, line 29 in JP1997-286939A (JP-H09-286939A) and the like.

Typical examples of the cationic monomer include an unsaturated amino group containing monomer, an unsaturated ammonium salt containing monomer, and the like. Out of these, N,N-dimethyl amino ethyl (meth)acrylate and N—(N', N'-dimethyl amino propyl) (meth)acrylamide are preferable.

Typical examples of the anionic monomer include an unsaturated carboxylate monomer, an unsaturated sulfonate monomer, an unsaturated phosphorate monomer, and the like.

Examples of the unsaturated carboxylate monomer include acrylic acid, methacrylic acid, croton acid, β-carboxyethyl acrylate, itaconic acid, malic acid, fumaric acid, citraconic acid, 2-methacryloyloxy methyl succinic acid, and the like.

Examples of the unsaturated sulfonic acid monomer include styrene sulfonic acid, 2-acrylamide-2-methyl propanesulfonic acid, 3-sulfopropyl (meth)acrylate, bis-(3-sulfopropyl)-itaconate, and the like.

Examples of the unsaturated phosphorus acid monomer include vinyl phosphoric acid, vinyl phosphate, bis(methacryloxy ethyl) phosphate, diphenyl-2-acryloyloxyethyl phosphate, diphenyl-2-methacryloyloxy ethyl phosphate, dibutyl-2-acryloyloxyethyl phosphate, and the like.

Examples of the salt-forming group containing monomer, the anionic monomer is preferable, and out of these, an unsaturated carboxylic acid monomer is more preferable and acrylic acid and methacrylic acid are particularly preferable from the point of view of dispersion stability, discharging and the like.

The specified resin may contain other repeating units.

Examples of the other repeating units include a repeating unit which is derived from alkyl (meth)acrylate with 1 to 20 carbon atoms, styrene or a derivative thereof, or the like.

The method for synthesizing the specified resin is not particularly limited but random polymerization of a vinyl monomer is preferable from the point of view of dispersion stability.

As the resin which has a salt-forming group, a copolymer, which is obtained using a carboxyl group-containing monomer with at least one of an alkyl (meth)acrylate with 1 to 20 carbon atoms, a (meth)acrylate which has an aromatic ring group, or a (meth)acrylate which has an alicyclic group, is preferable.

Out of these, as the resin which has a salt-forming group, a copolymer, which is obtained by copolymerizing (meth)acrylate with at least one of benzyl (meth)acrylate, phenoxyethyl (meth)acrylate, cyclohexyl (meth)acrylate, and isobornyl (meth)acrylate (that is, a copolymer which at least contains a repeating unit derived from (meth)acrylic acid and a repeating unit derived from at least one of benzyl (meth)acrylate, phenoxyethyl (meth)acrylate, cyclohexyl (meth)acrylate, and isobornyl (meth)acrylate), is particularly preferable.

The resin preferably has an acid value (the acid value before cross linking in a case where the resin is cross-linked) of 50 to 250 mg KOH/g and more preferably 50 to 150 mg KOH/g from the point of view of dispersion of the pigment. Here, the acid value of the resin is measured using a method disclosed in the JIS standard (JIS K0070:1992).

In addition, in a case where the resin is cross-linked, the cross-linking ratio of the resin is preferable 1 to 60 mol %, is more preferable 5 to 50 mol %, and is even more preferable 10 to 45 mol % from the point of view of dispersion stability of the pigment and aggregation of the ink composition. Here, the cross-linking ratio (mol %) is a value determined by the following formula.

Cross-linking ratio(mol %)=[number of mol equivalents of cross-linking agent reacted with 1 mol of polymer×100/number of mol of reactive groups which can be reacted in 1 mol of polymer with cross-linking agent]

Here, [number of mol equivalents of cross-linking agent reacted with 1 mol of polymer] is a value where the number of mol of the cross-linking agent reacted with 1 mol of polymer is multipled with the number of reactive groups in one molecule of the cross-linking agent.

The resin preferably has a weight average molecular weight (weight average molecular weight before cross linking in a case where the resin is cross-linked) of 3,000 to 100,000, and 5,000 to 80,000 is more preferable and 10,000 to 60,000 is even more preferable from the point of view of dispersion of the pigment.

Here, the weight average molecular weight of the resin is the molecular weight which is detected using a differential refractometer using a GPC analysis apparatus which is provided with the columns of TSKgel GMHxL, TSKgel G4000HxL, and TSKgel G2000HxL (trade names, all prepared by Tosoh Co., Ltd.) and with THF used as a solvent and is expressed by a calculation using polystyrene as a reference substance.

The mass ratio of the resin and the pigment in the black ink composition [mass of resin/mass of pigment] is preferably 0.30 to 0.80 from the point of view of stability and the like of the ink composition.

In addition, in the present invention, in a case where the water-soluble resin is used as the resin, a water-insoluble resin (for example, a water-insoluble dispersing agent) may be used in combination in addition to the water-soluble resin.

As the water-insoluble resin, a water-insoluble resin which has a hydrophobic structural unit and a hydrophilic structural unit can be used. As the hydrophilic structural unit, a structural unit which has a salt-forming group is preferable, a structural unit which has an acidic group is more preferable, and a structural unit which has a carboxyl group is particularly preferable.

Examples of the water-insoluble resin include a styrene-(meth)acrylic acid copolymer, a styrene-(meth)acrylic acid-(meth)acrylic acid ester copolymer, a (meth)acrylic acid ester-(meth)acrylic acid copolymer, a polyethylene glycol (meth)acrylate (meth)acrylic acid copolymer, a vinyl acetate-maleic acid copolymer, a styrene-maleic acid copolymer, and the like. More specifically, for example, the water-insoluble resins, which are disclosed in JP2005-41994A, JP2006-273891A, JP2009-084494A, JP2009-191134A, and the like, can be appropriately used in the present invention.

(Cross-Linking Agent)

The resin which covers the pigment in the resin covered pigment is preferably cross-linked by a cross-linking agent.

If the cross-linking agent is a compound which has at least two or more moieties which react with the resin, there is no particularly limitation, but specifically, the cross-linking agent is preferably a compound which has two or more epoxy groups (an epoxy compound with two or more functions) from the point of view of a superior reaction with the carboxyl group.

Specific examples of the cross-linking agent include ethylene glycol diglycidyl ether, polyethylene glycol diglycidyl ether, 1,6-hexane diol diglycidyl ether, diethylene glycol diglycidyl ether, dipropylene glycol diglycidyl ether, polypropylene glycol diglycidyl ether, trimethylolpropane triglycidyl ether, and the like, and polyethylene glycol diglycidyl ether, diethylene glycol diglycidyl ether, and trimethylolpropane triglycidyl ether are preferable.

As the cross-linking agent, commercially available products can also be used. As a commercially available product, for example, Denacol EX-321, EX-821, EX-830, EX-850, and EX-851 (manufactured by Nagase ChemteX Corp.) or the like can be used.

The mol ratio of the cross-linking moiety of the cross-linking agent (for example, an epoxy group) and the cross-linked moiety of the resin (for example, a carboxyl group) is preferably 1:1 to 1:10, is more preferably 1:1 to 1:5, and is most preferably 1:1 to 1:1.5 from the point of view of the speed of the cross-linking reaction and the dispersion stability after cross linking.

<Water-Soluble Polymerization Compound>

The black ink composition of the present invention contains at least one type of water-soluble polymerizable compound.

Due to this, the black ink composition of the present invention is polymerized and cured by the irradiation of an active energy ray (for example, radiation, light, or an electron beam).

Here, "water-soluble" in the polymerizable compound refers to that the polymerizable compound can be dissolved to a certain concentration or more in water. Specifically, solubility with regard to water at 25° C. is preferably 5 mass % or more and is more preferable 10 mass % or more. In addition, the water-soluble polymerizable compound preferably can be dissolved in an aqueous ink composition (preferably uniformly). In addition, the water-soluble polymerizable compound may be dissolved in the ink composition (preferable uniformly) by the solubility being increased due to the addition of a water-soluble organic solvent which will be described later.

The water-soluble polymerizable compound in the present invention is not particularly limited and may be a monofunctional polymerizable compound or may be a multifunctional polymerizable compound.

As the water-soluble polymerizable compound, it is preferable that at least any one type selected from a group formed of a compound which has a (meth)acrylic ester structure in the molecule and a compound which has a (meth)acrylamide structure in the molecule is contained therein and it is more preferable that at least any one type selected from a compound which has a (meth)acrylamide structure in the molecule is contained therein. Here, the (meth)acrylic ester structure has the meaning of at least either a methacrylic ester structure or an acrylic ester structure and the (meth)acrylamide structure has the meaning of at least either a methacrylamide structure or an acrylamide structure.

(Compound with (Meth)Acrylic Ester Structure in Molecule)

The polymerizable compound which has a (meth)acrylic ester structure in the molecule may be a monofunctional polymerizable compound or a multifunctional polymerizable compound without being limited as long as it is a polymerizable compound which is soluble in water and has a (meth)acrylic ester structure in the molecule.

Examples of the monofunctional polymerizable compound which has a (meth)acrylic ester structure in the molecule include hydroxyethyl (meth)acrylate, methyl (meth)acrylate, and ethyl (meth)acrylate.

The multifunctional polymerizable compound which has a (meth)acrylic ester structure in the molecule is preferably a compound represented by the following general formula (M-1),

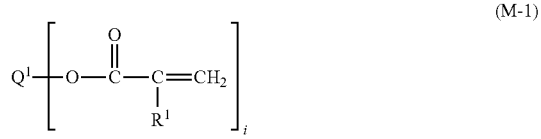

(M-1)

In the general formula (M-1), $Q^1$ represents an i-valent linking group and $R^1$ represents a hydrogen atom or a methyl group. In addition, i represents an integer of 2 or more.

The compound represented by the general formula (M-1) is where an unsaturated monomer bonds with the linking group $Q^1$ via the ester bond. $R^1$ represents a hydrogen atom or a methyl group and is preferably a hydrogen atom. The valent number i of the linking group $Q^1$ is not limited but is more preferably 2 or more and 6 or less and is even more preferably 2 or more and 4 or less.

In addition, the linking group $Q^1$ is not particularly limited as long as it is a group which is able to link with a (meth)acrylic ester structure, but it is preferably selected from a linking group where the compound represented by the general formula (M-1) is able to satisfy the water solubility described above. Specifically, examples thereof can include a residue where 1 or more hydrogen atoms or a hydroxyl group has been removed from the following compound group X.

Compound Group X

Polyols such as ethylene glycol, diethylene glycol, triethylene glycol, polyethylene glycol, propylene glycol, dipropylene glycol, tripropylene glycol, polypropylene glycol, 1,3-propanediol, 1,2-butanediol, 1,3-butanediol, 1,4-butanediol, 2,3-butanediol, 1,5-pentanediol, 1,4-pentanediol, 2,4-pentanediol, 3-methyl-1,5-pentane diol, 2-methyl-2,4-pentane diol, 1,5-hexanediol, 1,6-hexanediol, 2,5-hexanediol, glycerin, 1,2,4-butane triol, 1,2,6-hexane triol, 1,2,5-pentane triol, thioglycol, trimethylolpropane, ditrimethylolpropane, trimethylolethane, ditrimethylolethane, neopentyl glycol, pentaerythritol, dipentaerythritol, condensates thereof, low-molecular-weight polyvinyl alocohols, and sugars; and polyamines such as ethylenediamine, diethylenetriamine, triethylenetetramine, polyethyleneimine, and polypropylene diamine.

Furthermore, as the linking group $Q^1$, a substituted or unsubstituted alkylene chain with 4 or less carbon atoms such as a methylene group, an ethylene group, a propylene group, and a butylene group, and furthermore, a functional group which has a saturated or unsaturated hetero ring such as a pyridine ring, an imidazole ring, a pyrazine ring, a piperidine ring, a piperazine ring, and a morpholine ring can be exemplified.

Out of these, as the linking group $Q^1$, a residue of polyols which contains an oxyalkylene group (preferably, an oxyethylene group) is preferable and a residue of polyols which contains three or more oxyalkylene groups (preferably, oxyethylene groups) is particularly preferable.

Specific examples of the water-soluble polymerizable compound which has a (meth)acrylic ester structure in the molecule include the nonionic compounds shown below, but the present invention is not limited thereto.

Nonionic Compound 1

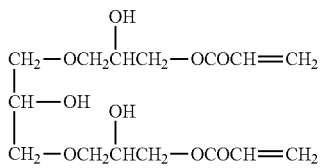

Nonionic Compound 2

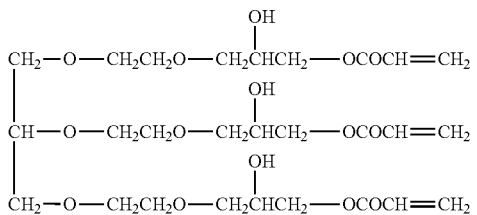

Nonionic Compound 3

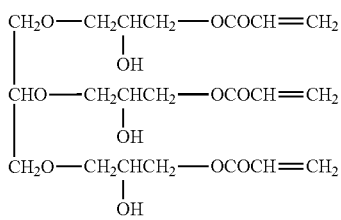

Nonionic Compound 4

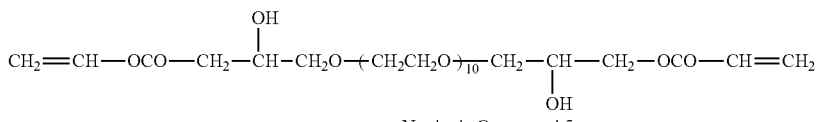

Nonionic Compound 5

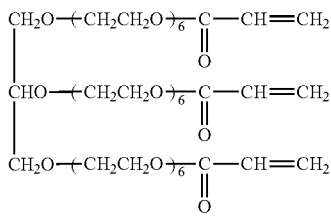

Nonionic Compound 6

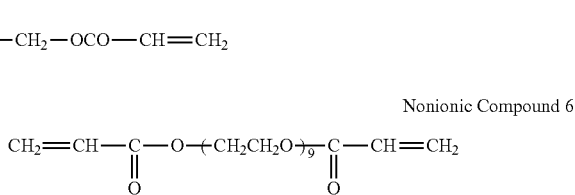

In addition, as the nonionic polymerizable compound, a (meth)acrylate ester which has two or more acryloyl groups derived from a polyol compound in one molecule can also be used. Examples of the polyol compound include glycol condensates, an oligo ether, oligo esters, and the like or a polyol compound which has two or more hydroxyl groups such as monosaccharides or disaccharides.

In addition, a (meth)acrylic acid ester which is derived from such astriethanolamine, diethanolamine, trishydroxy amino methane, and tris hydroxy amino ethane also are appropriate.

—Compound with (Meth)Acrylamide Structure in Molecule—

The compound which has a (meth)acrylamide structure in the molecule may be a monofunctional polymerizable compound or a multifunctional polymerizable compound without being limited as long as it is a polymerizable compound which has a (meth)acrylamide structure in the molecule.

Examples of the monofunctional polymerizable compound which has a (meth)acrylamide structure in the molecule include hydroxyethyl (meth)acrylamide, hydroxypropyl (meth)acrylamide, dimethylaminoethyl (meth)acrylamide, dimethylaminopropyl (meth)acrylamide and the like, particularly preferable is a hydroxyethyl (meth)acrylamide, and most preferable is a hydroxyethyl acrylamide.

The multifunctional polymerizable compound which has a (meth)acrylamide structure in the molecule is preferably a compound represented by the following general formula (M-2). Due to having the structure of the formula (M-2), it is preferable since the compatibility of the compound represented by the general formula (1) which will be described later and the polymerizable compound is improved and curing sensitivity of the polymerizable compound and the like can be improved.

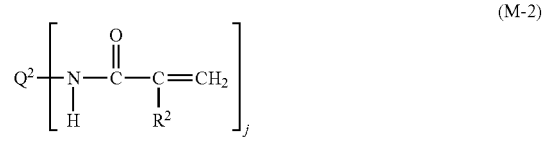

(M-2)

In the general formula (M-2), $Q^2$ represents a j-valent linking group and $R^2$ represents a hydrogen atom or a methyl group. In addition, j represents an integer of 2 or more.

The compound represented by the general formula (M-2) is where an unsaturated monomer bonds to the linking group $Q^2$ through the amide bond. $R^2$ represents a hydrogen atom or a methyl group and is preferably a hydrogen atom. The valent number j of the linking group $Q^2$ is not limited but is more preferably 2 or more and 6 or less and is even more preferably 2 or more and 4 or less.

In addition, the linking group $Q^2$ is not particularly limited as long as it is a group which is able to link with a (meth)acrylamide structure. The details of the linking group $Q^2$ is the same as the linking group $Q^1$ described above and the preferable format is also the same.

Specific examples of the water-soluble polymerizable compound which has a (meth)acrylamide structure in the molecule include the water-soluble polymerizable compounds shown below.

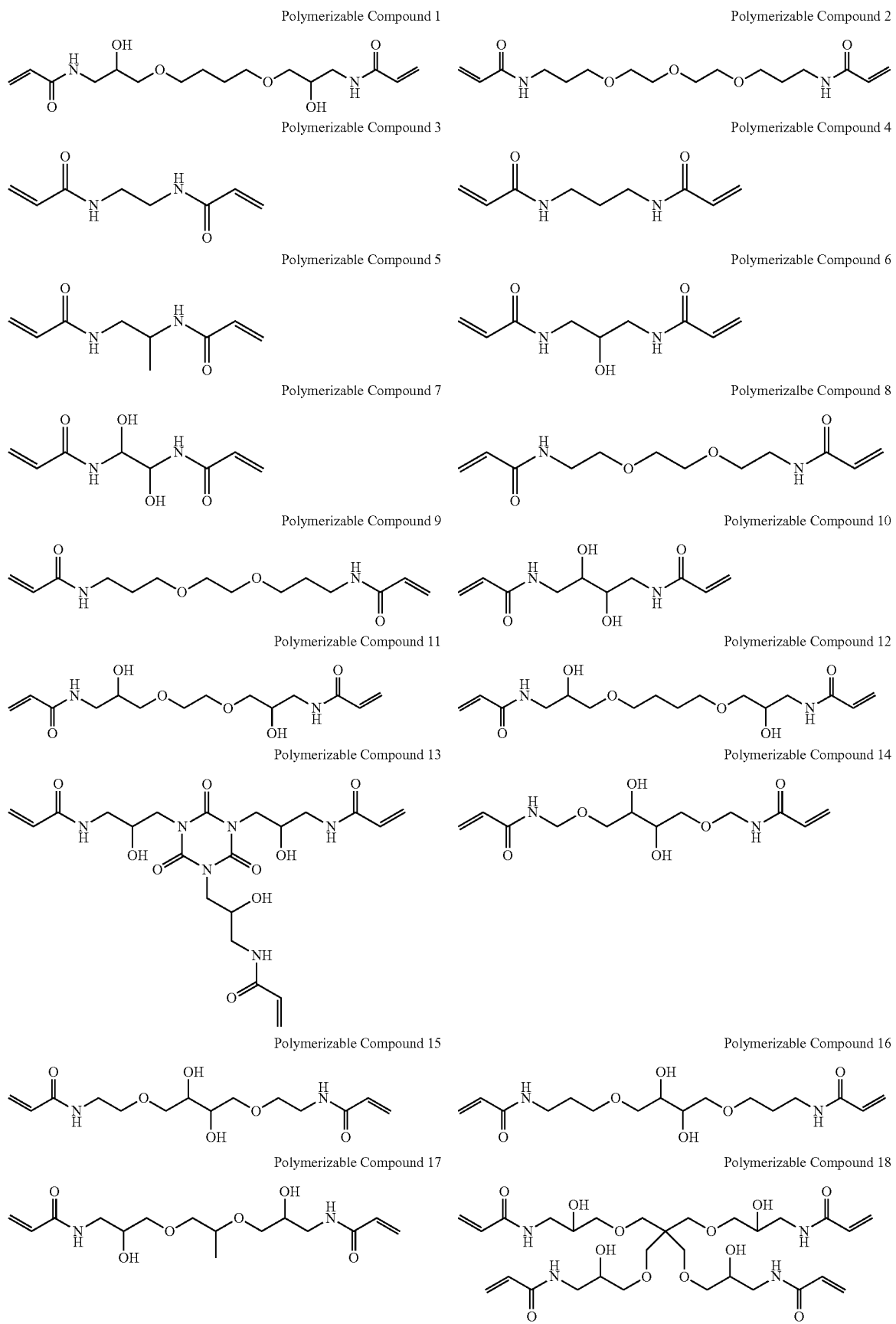

Polymerizable Compound 19
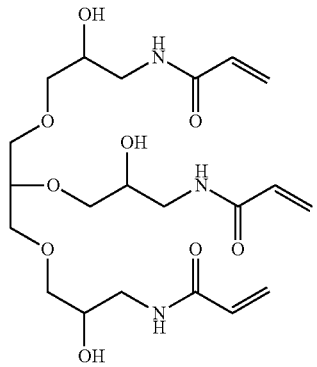
Polymerizable Compound 20
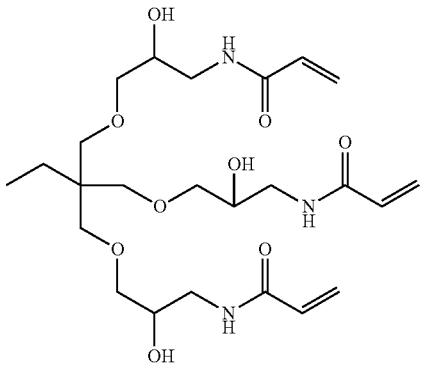
Polymerizable Compound 21
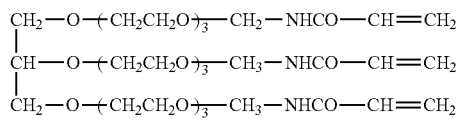
Polymerizable Compound 22
$C-[CH_2-O-(CH_2CH_2O)_3-CH_2-NHCO-CH=CH_2]_4$
Polymerizable Compound 23
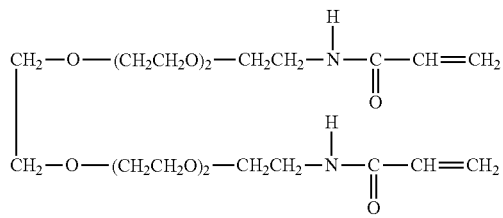
Polymerizable Compound 24
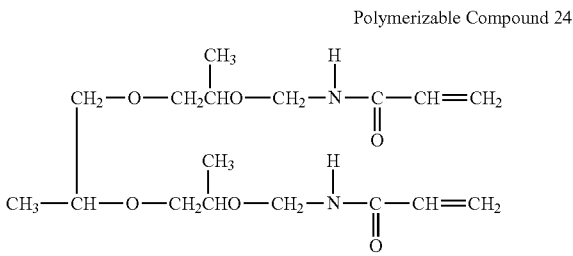
Polymerizable Compound 25
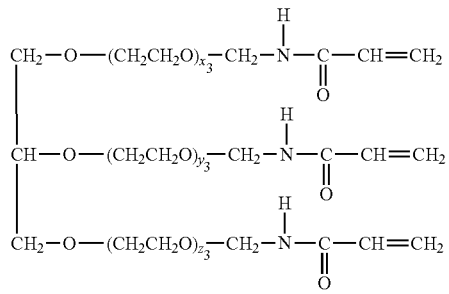
$x_3 + y_3 + z_3 = 6$
Polymerizable Compound 26
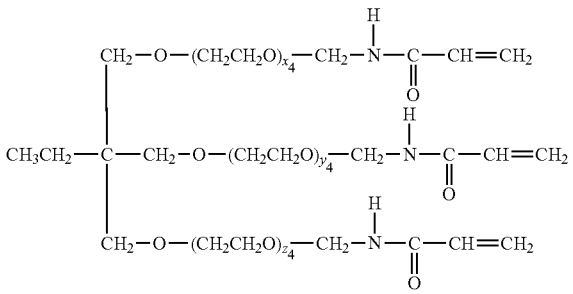
$x_4 + y_4 + z_4 = 9$
Polymerizable Compound 27
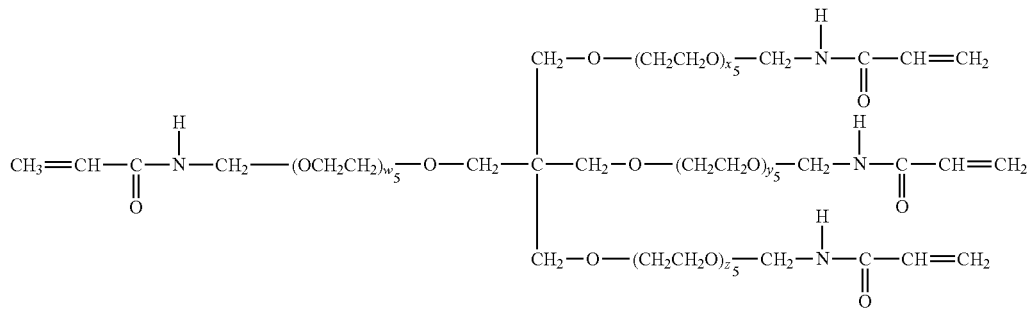
$w_5 + x_5 + y_5 + z_5 = 6$ Polymerizable Compound 28
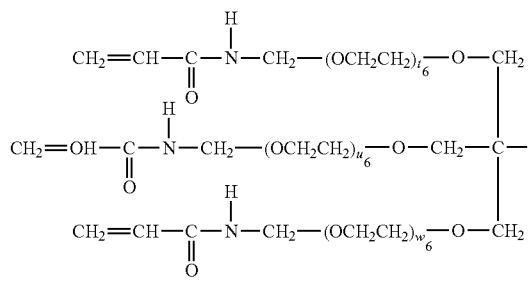
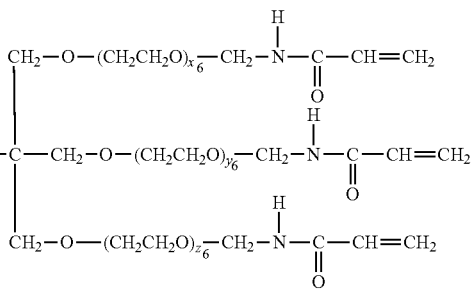
$t_6 + u_6 + w_6 + x_6 + y_6 + z_6 = 12$
Polymerizable Compound 29
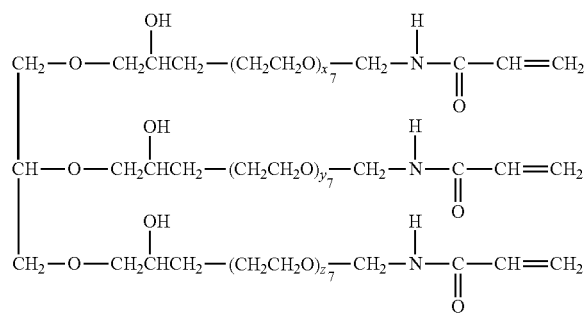
$x_7 + y_7 + z_7 = 3$
Polymerizable Compound 30
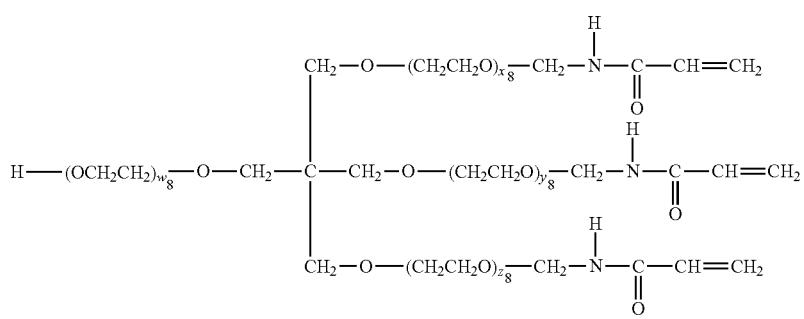
$w_8 + x_8 + y_8 + z_8 = 6$
Polymerizable Compound 31
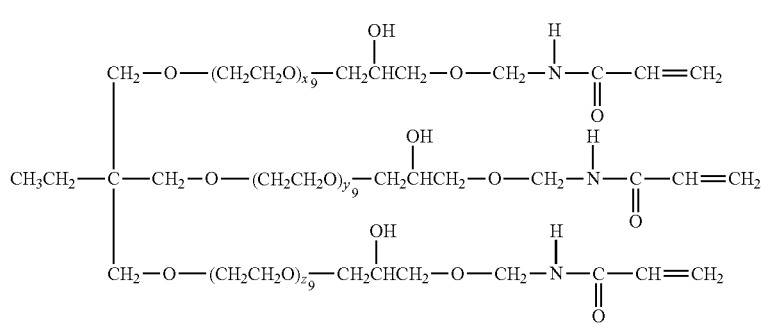
$x_9 + y_9 + z_9 = 3$
Polymerizable Compound 32
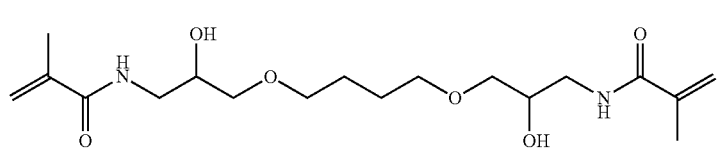

Other than the polymerizable compound, for example, a compound which has a maleimide structure, a compound which has a sulfamide structure, or a compound which has a N-vinyl acetamide structure which are represented below or the like can also be used.

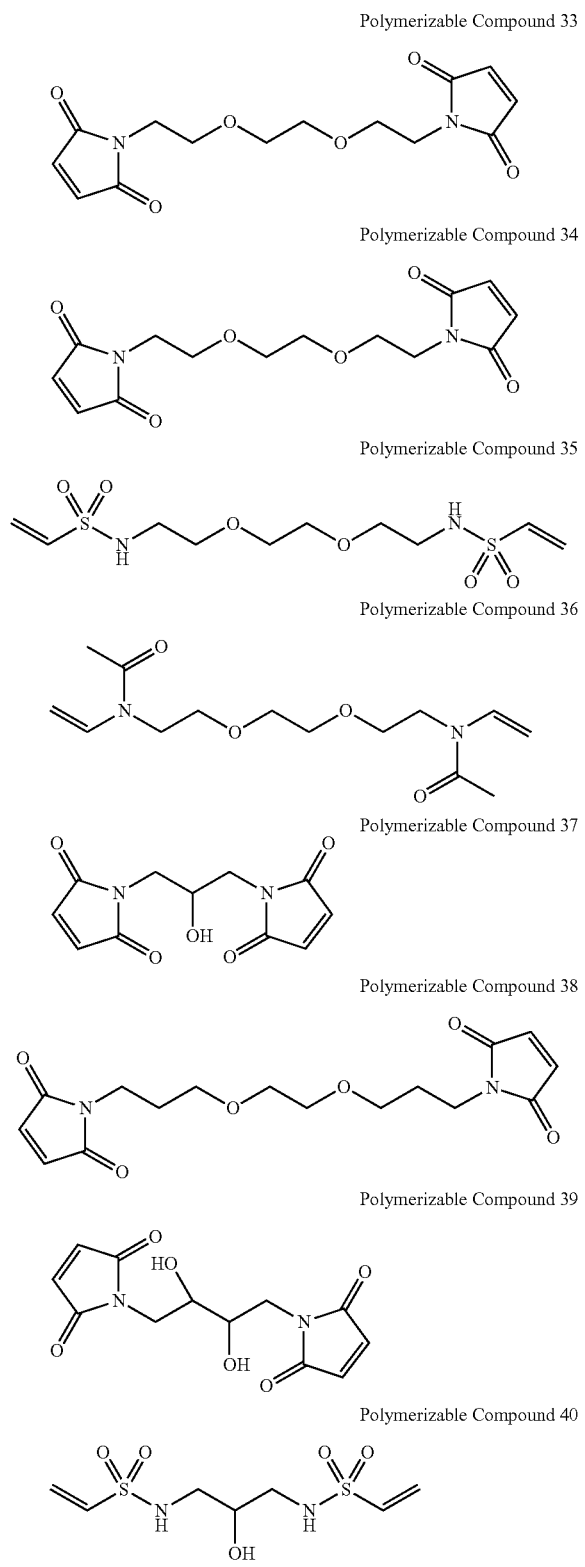

Polymerizable Compound 33

Polymerizable Compound 34

Polymerizable Compound 35

Polymerizable Compound 36

Polymerizable Compound 37

Polymerizable Compound 38

Polymerizable Compound 39

Polymerizable Compound 40

Polymerizable Compound 41

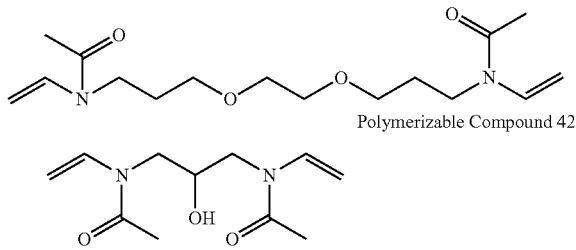

Polymerizable Compound 42

The water-soluble polymerizable compound can be contained as one type singly or two or more types in combination.

As the total content of the water-soluble polymerizable compound in the ink composition, 3 to 50 mass % is preferable with regard to the total mass of the ink composition, 10 to 30 mass % is more preferable, and 15 to 25 mass % is even more preferable.

In the ink composition of the present invention, the effect of improving blocking resistance is more effectively accomplished in a case where the water-soluble polymerizable compound contains both the monofunctional polymerizable compound and the multifunctional polymerizable compound.

That is, typically, there is a tendency for curing to be insufficient and blocking resistance to be reduced in an ink composition which uses a monofunctional polymerizable compound, but in the ink composition of the present invention, it is easy to preferably maintain the blocking resistance even in the case where the monofunctional polymerizable compound is used. As a result, the effect of improving blocking resistance in the present invention is more remarkably accomplished in the case where the water-soluble polymerizable compound contains both the monofunctional polymerizable compound and the multifunctional polymerizable compound.

In the case where the water-soluble polymerizable compound contains the monofunctional polymerizable compound, the monofunctional polymerizable compound which has a (meth)acrylamide structure is preferable as the monofunctional polymerizable compound from the point of view of further improving the blocking resistance.

Furthermore, scratch resistance is improved due to the water-soluble polymerizable compound containing the monofunctional polymerizable compound which has a (meth)acrylamide structure.

In a case where the water-soluble polymerizable compound contains at least one type of monofunctional polymerizable compound which has a (meth)acrylamide structure, the water-soluble polymerizable compound particularly preferably contains at least one type of multifunctional polymerizable compound (preferably a multifunctional polymerizable compound which has a (meth)acrylamide structure) in addition to the at least one type of the monofunctional polymerizable compound which has the (meth)acrylamide structure.

In a case where the water-soluble polymerizable compound contains a monofunctional polymerizable compound (for example, a monofunctional polymerizable compound which has a (meth)acrylamide structure), the content of the monofunctional polymerizable compound (for example, the monofunctional polymerizable compound which has a (meth)acrylamide structure) with regard to the total mass of the polymerizable compound contained in the ink composition is preferably 10 to 90 mass %, is more preferably 20 to 80 mass %, is even more preferably 30 to 80 mass %, and is particularly preferably 40 to 80 mass %.

<Polymerization Initiator>

The black ink composition of the present invention contains at least one type of polymerization initiator.

The polymerization initiator preferably is a water-soluble polymerization initiator. Here, "water-soluble" in the polymerization initiator has the meaning of 0.5 mass % or more of the polymerization initiator is dissolved in distilled water at 25° C. Dissolving of 1 mass % or more of the water-soluble polymerization initiator in distilled water at 25° C. is preferable and dissolving of 3 mass % or more is more preferable.

Examples of the water-soluble polymerization initiator can include the compound represented by the general formula (1) described below, the compound disclosed in JP2005-307198A, and the like. Out of these, the water-soluble polymerization initiator represented by the general formula (1) described below is preferable from the point of view of adhesion and scratch resistance.

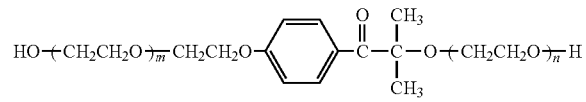

(1)

in the general formula (1), m and n each independently represent an integer of 0 or more and m+n represents an integer of 0 to 3.

In the general formula (1), it is preferable that m is 0 to 3 and n is 0 or 1 and it is more preferable that m is 0 or 1 and n is 0.

Specific examples of the compound represented by the general formula (1) are shown below, but the present invention is not limited thereto.

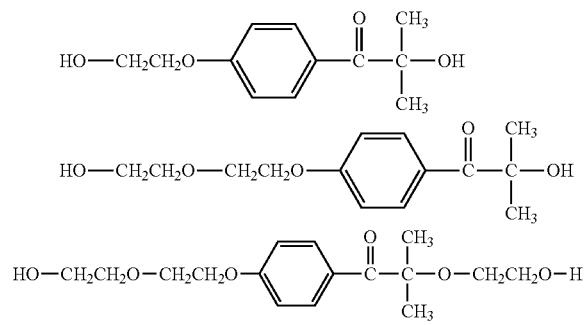

The compound represented by the general formula (1) may be a commercially available compound or may be a compound which is synthesized based on the disclosure of JP2005-307198A or the like. As the commercially available compound represented by the general formula (1), Irgacure 2959 is exemplified (m=0 and n=0).

The content of the polymerization initiator in the ink composition of the present invention is preferably in the range of 0.1 to 30 mass % in solid content conversion, is even more preferably in the range of 0.5 to 20 mass %, is even more preferably in the range of 1.0 to 15 mass %, and is most preferably in the range of 1.0 to 5.0 mass %.

<Polymer Containing Repeating Unit Represented by General Formula (i)>

The black ink composition of the present invention can contain a polymer which contains a repeating unit represented by the following general formula (i) (hereinafter, may be referred simply as "(component a)"). Due to the black ink composition of the present invention containing the (component a), the scratch resistance of the image is further improved.

The repeating unit represented by the general formula (i) which exists in a plurality in the (component a) may be the same as each other or may be different.

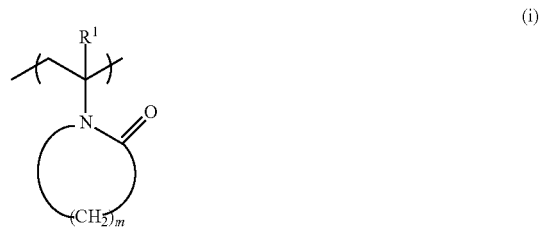

(i)

In the general formula (i), m represents an integer of 2 to 15 and $R^1$ represents a hydrogen atom or a methyl group.

In the general formula (i), $R^1$ is preferably a hydrogen atom.

In the general formula (i), m is preferably an integer of 2 to 5, is more preferably 3 or 5, and is particularly preferably 3.

In a case where the repeating unit represented by the general formula (i) which exists in a plurality in the (component a) is different from each other, it preferably contains a repeating unit where m is 3 in the general formula (i) and a repeating unit where m is 5 in the general formula (i).

The (component a) preferable contains 50 mass % or more of the repeating unit represented by the general formula (i) with regard to the total mass of the (component a), more preferably contains 75 to 100 mass %, and particularly preferably contains 80 to 100 mass %.

The (component a) preferably further contains a repeating unit represented by the following general formula (ii).

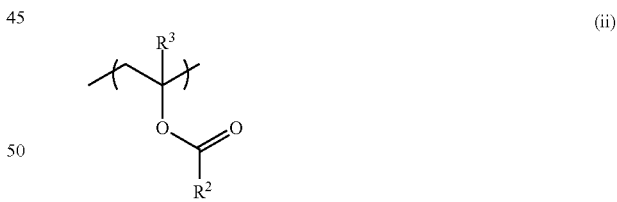

(ii)

In the general formula (ii), $R^2$ represents an alkyl group and $R^3$ represents a hydrogen atom or a methyl group.

As the alkyl group represent by $R^2$ in the general formula (ii), an alkyl group with 1 to 5 carbon atoms is preferable. Specific examples of the alkyl group include a methyl group, an ethyl group, a butyl group, and the like.

As the alkyl group represent by $R^2$ in the general formula (ii), an alkyl group with 1 to 3 carbon atoms is more preferable and an alkyl group with 1 carbon atom (that is, a methyl group) is particularly preferable.

In the general formula (ii), $R^3$ is preferably a hydrogen atom.

The (component a) preferable contains 1 mass % to 80 mass % or more of the repeating unit represented by the general formula (ii) with regard to the total mass of the (component a), more preferably contains 1 mass % to 50 mass %, and particularly preferably contains 1 mass % to 10 mass %.

The (component a) preferably has a molecular weight of 500 to 800,000 (weight average molecular weight in case that the (component a) has molecular weight distributions), more preferably 800 to 100,000, and even more preferable 1,000 to 25,000.

Here, the weight average molecular weight is measured by gel permeation chromatography (GPC). The GPC uses HLC-8020 GPC (manufactured by Tosoh Co., Ltd.) and uses the three columns of TSKgel Super HZM-H, TSKgel Super HZ4000, and TSKgel Super HZ200 as a column (manufactured by Tosoh Co., Ltd., 4.6 mm ID×15 cm), and THF (tetrahydrofuran) is used as an eluent.

Specific examples of the (component a) include polyvinyl pyrrolidone (PVP K12 (manufactured by Across Corporation) and PVP K15 and PVP K30 (both manufactured by ISP Japan Ltd.), a vinylpyrrolidone/vinyl acetate copolymer (Luvitec VA64W and Luviskol VA37E (both manufactured by BASF Japan), PVP/VA W635 (manufactured by ISP Japan Ltd.)), and a vinylpyrrolidone/vinyl caprolactam copolymer (Luvitec VPC K65W (manufactured by BASF Japan) and the like, and polyvinyl pyrrolidone (PVP K15, K30 (both manufactured by ISP Japan Ltd.), a vinylpyrrolidone/vinyl acetate copolymer (PVP/VA W635 (manufactured by ISP Japan Ltd.) and Luviskol VA37E (manufactured by BASF Japan)), and a vinylpyrrolidone/vinyl caprolactam copolymer (Luvitec VPC K65W (manufactured by BASF Japan) are preferable.

In a case where the black ink composition of the present invention includes the (component a), the (component a) may be included as one type singly or contained as two or more types.

In a case where the black ink composition of the present invention includes the (component a), the content of the (component a) (the total content in a case of two or more types) with regard to the total mass of the black ink composition is preferably 0.1 to 10 mass %, is more preferably 0.1 to 5 mass %, is more preferably 0.5 to 5 mass %, and is particularly preferably 0.5 to 3 mass %.

<Colloidal Silica>

The black ink composition of the present invention preferably further contains at least one type of colloidal silica. Due to the inclusion of colloidal silica, discharge stability can be improved and a reduction in liquid repellency in the ink jet head member can be suppressed. In particular, the effect thereof is particularly large in a case where silicon is used in at least a portion of the ink jet head member.

Here, it is considered that, for example, by colloidal silica being included, due to hydrolysis of the ink components being effectively suppressed and the stability of the ink composition being improved, a superior effect can be obtained in terms of discharge stability (recovery after period of nonuse) even in a case where discharging of the ink composition in the ink jet recording apparatus is stopped, is left for a certain period of time, and then discharging is restarted and can be compatible with scratch resistance in the image. Furthermore, it is estimated that a reduction in liquid repellency can be prevented due to colloidal silica being appropriately absorbed into the surface of the ink jet head member and corrosion of the surface due to the ink components being relieved.

The colloidal silica is a colloid formed from fine particles of an inorganic oxide which contains silicon where the average particle diameter is a few 100 nm or less. Silicon dioxide (including a hydrate thereof) is included as a main component and aluminate may be included as a component of a small amount. Examples of the aluminate which may be included in a small amount include sodium aluminate, potassium aluminate, and the like.

In addition, the colloidal silica may include an inorganic salt such as sodium hydroxide, potassium hydroxide, lithium hydroxide, and ammonium hydroxide and an organic salt such as tetramethyl ammonium hydroxide. For example, the inorganic salt and the organic salt act as a stabilizing agent of the colloid.

The dispersion medium of the colloidal silica is not particularly limited and may be any of water, an organic solvent, or a mixture thereof. The organic solvent may be a water-soluble organic solvent or a water-insoluble organic solvent, but a water-soluble organic solvent is preferable. Specific examples thereof can include methanol, ethanol, isopropyl alcohol, n-propanol, and the like.

The manufacturing method of the colloidal silica is not particularly limited and manufacturing where a normal method is used is possible. For example, manufacturing is possible from aerosil synthesis using thermal decomposition of silicon tetrachloride and from water glass. Alternatively, manufacturing is possible using a liquid phase synthesis method such as hydrolysis of the alkoxide (for example, refer to "Fiber and Industry", Vol. 60, No. 7 (2004), p. 376) and the like.

The average particle diameter of the particles which are included in the colloidal silica in the present invention is not particularly limited, but 1 nm to 25 nm is preferable, 3 nm to 20 nm is more preferable, 3 nm to 15 nm is even more preferable, and 5 nm to 10 nm is particularly preferable.

When the average particle diameter is 25 nm or less, damage with regard to the members which configure the ink jet head, for example, the base material, protective film, liquid repellant film, and the like, due to ink (for example, a reduction in liquid repellency and the like) can be more effectively suppressed. Here, it can be considered that, for example, due to reducing the average particle diameter, it can be considered that the total surface area of the particles is increased and damage with regard to the members which configure the ink jet head is more effectively suppressed. In addition, furthermore, the average particle diameter of the particles is preferably 25 nm or less from the point of view of the discharging of the ink composition and the polishing agent effect due to the particles. In addition, by the average particle diameter being 1 nm or more, colloidal silica where productivity is improved and variation in performance is low can be obtained.

The average particle diameter of the colloidal silica in the present invention can be measured using a technique such as a light scattering method, a laser diffraction method, and the like which are typical for measuring dispersed particles, but in the present invention, as a more direct technique, the average primary particle diameter is calculated as an arithmetical mean by actually measuring the particle diameters (area equivalent circle diameter) of 300 colloidal silica particles which are arbitrarily selected using a TEM (transmission electron microscope) imaging method. That is, the average particle diameter of the colloidal silica which can be used in the present invention expresses the arithmetical mean of the particle diameter of the area equivalent circle diameter.

In addition, the shape of the colloidal silica is not particularly limited as long as the discharge performance of the ink composition is not inhibited. For example, the shape may be any of a spherical shape, a longitudinal shape, a needle shape, a beaded shape. Out of these, a spherical shape is preferable from the point of view of the discharging of the ink composition.

<Surfactant>

The black ink composition of the present invention preferably contains at least one type of surfactant. The surfactant can be used as a surface tension adjusting agent.

As the surface tension adjusting agent, a compound which has a structure having both a hydrophilic portion and a hydrophobic portion in a molecule or the like can be effectively used and any of an anionic surfactant, a cationic surfactant, an amphiprotic surfactant, a nonionic surfactant, or a Betaine surfactant can be used.

In the present invention, a nonionic surfactant is preferable from the point of view of suppressing ejection inference with regard to the ink composition, and out of these, an acetylene glycol surfactant is more preferable.

Examples of the acetylene glycol-based surfactant can include an alkylene oxide adduct of 2,4,7,9-tetramethyl-5-decyne-4,7-diol or 2,4,7,9-tetramethyl-5-decyne-4,7-diol or the like and at least any one type selected from these is preferable. Examples of the commercially available product of these compounds include the E series such as Olfin E1010 of Nissin Chemical Industry Co., Ltd.

In a case where a surfactant (surface tension adjusting agent) is contained in the black ink composition, the amount of the surfactant contained is preferably in the range so that the surface tension of the ink composition can be adjusted to be 20 to 60 mN/m from the point of view of effectively performing the discharging of the ink composition using an ink jet method, is more preferably 20 to 45 mN/m from the point of view of the surface tension, and is even more preferably 25 to 40 mN/m.

The specific amount of the surfactant in the black ink composition is not particularly limited other than the surface tension being in the desired range, but 0.1 mass % or more is preferable, 0.1 to 10 mass % is more preferable, and 0.2 to 3 mass % is even more preferable.

Water-Soluble Organic Solvent

The black ink composition of the present invention contains at least water, however can further contain at least one type of water-soluble organic solvent in addition to water.

The water-soluble organic solvent can obtain drying prevention and wetting or a permeation promotion effect. In the drying prevention, the water-soluble organic solvent is used as a drying prevention agent which prevents the formation of aggregates and clogging due to the adhesion and drying of ink in the ink discharge port of an ejection nozzle, and in the drying prevention and wetting, a water-soluble organic solvent with a vaporization pressure lower than water is preferable. In addition, in the permeation promotion, the water-soluble organic solvent can be used as a permeation promoting agent which increases the permeation of ink into paper.

Examples of the water-soluble organic solvent includes an alkane diol (polyhydric alcohols) such as glycerin, ethylene glycol, propylene glycol; sugar alcohols; alkyl alcohols with 1 to 4 carbon atoms such as ethanol, methanol, butanol, propanol, and isopropanol; glycol ethers such as an ethylene glycol monomethyl ether, an ethylene glycol monoethyl ether, an ethylene glycol monobutyl ether, an ethylene glycol monomethyl ether acetate, a diethylene glycol monomethyl ether, a diethylene glycol monoethyl ether, a diethylene glycol mono-n-propyl ether, an ethylene glycol mono-iso-propyl ether, a diethylene glycol mono-iso-propyl ether, an ethylene glycol mono-n-butyl ether, an ethylene glycol mono-t-butyl ether, a diethylene glycol mono-t-butyl ether, a triethylene glycol monomethyl ether, a 1-methyl-1-methoxy butanol, a propylene glycol monomethyl ether, a propylene glycol monoethyl ether, a propylene glycol mono-t-butyl ether, a propylene glycol mono-n-propyl ether, a propylene glycol mono-iso-propyl ether, a dipropylene glycol, a dipropylene glycol monomethyl ether, a dipropylene glycol monoethyl ether, a dipropylene glycol mono-n-propyl ether, a dipropylene glycol mono-iso-propyl ether, and a tripropylene glycol monomethyl ether. These can be used as one type singly or two or more types in combination.

<Resin Particles>

The black ink composition in the present invention can contain resin particles as required.

In addition, the resin particles preferably has a function which fixes the ink composition, that is, the image by increasing the viscosity of the ink composition due to aggregation or dispersion instability when coming into contact with a processing liquid which will be described later or a region on a recording medium where this has been dried. Such resin particles are preferably dispersed in water or at least one type of organic solvent.

Examples of the resin particles can include an acrylic-based resin, a vinyl acetate-based resin, a styrene-butadiene-based resin, a vinyl chloride-based resin, an acrylic-styrene-based resin, a butadiene-based resin, a styrene-based resin, a cross-linked acrylic resin, a cross-linked styrene-based resin, a benzoguanamine resin, a phenol resin, a silicone resin, an epoxy resin, an urethane-based resin, a paraffin-based resin, a fluorinate-based resin or latexes thereof. Preferable examples include an acrylic-based resin, an acrylic-styrene-based resin, a styrene-based resin, a cross-linked acrylic resin, or a cross-linked styrene-based resin.

In addition, the resin particles can be used in a latex form.

The weight average molecular weight of the resin particles is preferably 10,000 or more and 200,000 or less and is more preferably 20,000 or more and 200,000 or less.

In addition, the volume average particle diameter of the resin particles is preferable in the range of 1 nm to 1 μm, is more preferable in the range of 1 nm to 200 nm, is even more preferable in the range of 1 nm to 100 nm, and is particularly preferable in the range of 1 nm to 50 nm. Here, the volume average particle diameter of the resin particles can be measured using NANOTRACK particle size distribution measurement apparatus UPA-EX150 (manufactured by Nikkiso Co., Ltd.).

The glass transition temperature Tg of the resin particles is preferably 30° C. or more, is more preferably 40° C. or more, and is even more preferably 50° C. or more.

Particles of a self-dispersing resin (self-dispersing resin particles) are preferably used as the resin particles.

Here, the self-dispersing resin refers to a water-insoluble polymer which is able to be in a dispersion state in an aqueous medium due to a functional group (particularly a salt-forming group) in the polymer itself using a phase inversion emulsification method without a surfactant. Specific examples of the salt-forming group of the self-dispersing resin are the same as the salt-forming groups in the resin which covers the pigment and the preferable range is also the same.

Here, the dispersion state includes both the states of an emulsion state (emulsion) where the water-insoluble polymer is dispersed in a liquid state in the aqueous medium and a dispersion state (suspension) where the water-insoluble polymer is dispersed in a solid state in the aqueous medium.

As the self-dispersing resin particles, the self-dispersing resin particles disclosed in paragraphs 0090 to 0121 of JP2010-64480A and paragraphs 0130 to 0167 of JP2011-068085A can be used.

The added amount of the resin particles with regard to the black ink composition is preferable 0.1 to 20 mass %, is more preferable 0.1 to 10 mass %, and is even more preferable 0.1 to 5 mass %.

In addition, in relation to the particle diameter distribution of the resin particles, there is no particular limitation and any of a wide particle diameter distribution or a monodisperse particle diameter distribution is sufficient. In addition, two or more types of resin particles which have monodisperse particle distributions may be mixed and used.

<Other Components>

The black ink composition can further contain various additives as other additives in addition to the components above as required.

Examples of various types of additives include known additives such as an ultraviolet absorbing agent, an anti-fading agent, a fungicide, a pH adjusting agent, an anti-rust agent, an antioxidant, an emulsion stabilizers, a preservative, an antifoaming agent, a viscosity-adjusting agent, a dispersion stabilizer, and a chelating agent. The content of the additives may be arbitrarily determined according to the application, but for example, to the extent that each is 0.02 to 1.00 mass % in the black ink composition is sufficient.

<Properties of Black Ink Composition>

The surface tension of the ink composition (25° C.) of the present invention preferably is 20 mN/m or more and 60 mN/m or less. More preferably, the surface tension is 20 mN/m or more and 45 mN/m or less and is even more preferably 25 mN/m or more and 40 mN/m or less.

The surface tension is measured under the conditions where the ink composition is 25° C. using an Automatic Surface Tensiometer CBVP-Z (Kyowa Interface Sciences Co., Ltd.).

In addition, the viscosity of the ink composition of the present invention at 25° C. is preferably 1.2 mPa·s or more and 15.0 mPa·s or less, is more preferably 2 mPa·s or more and less than 13 mPa·s, and is even more preferably 2.5 mPa·s or more and less than 10 mPa·s.

The viscosity is measured under the conditions where the ink composition is 25° C. using VISCOMETER TV-22 (TOKI SANGYO Co., LTD.).

<Manufacturing Method>

The black ink composition can be prepared using a normal method. For example, manufacturing is possible by mixing a pigment dispersant which include at least one type of the colorant pigment and the carbon black pigment (or respective pigment dispersants which are prepared for each type of pigment), at least one type of water-soluble polymerizable compound, at least one type of polymerization initiator, water and other components (a surfactant and the like) as required. The mixing method is not particularly limited and a mixing method which is normally used can be appropriately selected and applied.

[Ink Set]

The ink set of the present invention includes at least one type of the black ink composition of the present invention which has been described and at least one type of the processing liquid which includes an flocculant which can form an aggregate by coming into contact with the black ink composition.

An image with further superior blocking resistance and scratch resistance can be formed by an image being formed using the image forming method which will be described later using the processing liquid in addition to the black ink composition. In addition, an image with superior adhesion and film strength can be obtained.

In addition, due to using the processing liquid, ink jet recording can be sped up, change in hue is suppressed and an image with superior blocking resistance and scratch resistance can be formed even with high speed recording. In addition, even with high-speed recording, an image with superior drawing with high density and resolution (for example the reproduction of fine lines and ultrafine portions) can be formed.

<Processing liquid>

The processing liquid is configured to contain at least one type of flocculant which can form an aggregate by coming into contact with the black ink composition which has been described and to further include another component as required.

The flocculant of the present invention can aggregate (fix) the components in the ink composition by coming into contact with the ink composition on the recording medium, and for example, functions as a fixing agent. For example, the components of the ink composition can be fixed on the recording medium by the components in the ink composition being aggregated due to the ink composition being further attached as droplets and coming into contact with the flocculant in a state where the flocculant exists on the recording medium by the processing liquid being added onto the recording medium (preferably, coated paper).

Examples of the flocculant include an acidic compound, a multivalent metal salt, and the flocculant may be a cationic polymer and the like. Out of these, the acidic compound is preferable from the point of view of the aggregating of the components of the ink composition. The flocculant may be used as one type singly or two or more types may be used in combination.

—Acidic Compound—

Examples of the acidic compound appropriately include sulfuric acid, hydrochloric acid, nitric acid, phosphoric acid, polyacrylic acid, acetic acid, glycolic acid, malonic acid, malic acid, maleic acid, ascorbic acid, succinic acid, glutaric acid, fumaric acid, citric acid, tartaric acid, lactic acid, sulfonic acid, orthophosphoric acid, metaphosphoric acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, and derivatives thereof, and the like.

Out of these an acidic compound with high water solubility is preferable. In addition, an acidic compound which is trivalent or less is preferable, and an acidic compound which is divalent or trivalent is particularly preferable from the point of view of fixing the whole of the ink composition by reacting with the components in the ink composition.

The acidic compound may be used as one type singly or two or more types may be used in combination.

In a case where the processing liquid includes the acidic compound, the pH of the processing liquid (25° C.) is preferably 0.1 to 6.8, is more preferably 0.5 to 6.0, and is even more preferably 0.8 to 5.0.

The content of the acidic compound with regard to the total mass of the processing liquid is preferably 40 mass % or less, is more preferably 15 to 40 mass %, and is even more preferably 15 mass % to 35 mass %. When the content of the acidic compound is 40 mass % or less, the components of the ink composition can be more effectively fixed.

—Multivalent Metal Salt—

Examples of the multivalent metal salt can include a salt of an alkaline earth metal which belongs to the second group in the periodic table (for example, magnesium and calcium), a transition metal which belongs to the third group in the periodic table (for example, lanthanum), a cation (for example, aluminum) from the thirteenth group of the periodic table or lanthanides (for example, neodymium). As these metal salts, a carboxylate (a salt of formic acid, acetic acid, benzoic acid, or the like), a nitrate, a chloride compound, and thiocyanate is appropriate. Out of these, a calcium salt or a magnesium salt of carboxylic acid (formic acid, acetic acid, benzoic acid, or the like), a calcium salt or a magnesium salt of nitric acid, calcium chloride, magnesium chloride, and a calcium salt or a magnesium salt of thiocyanic acid are preferable.

The multivalent metal salt may be used as one type singly or two or more types may be used in combination.

The content of the multivalent metal salt with regard to the total mass of the processing liquid is preferably 15 mass % or more. When the content of the multivalent metal salt is 15 mass % or more, the components of the ink composition can be more effectively fixed.

The content of the multivalent metal salt with regard to the total mass of the processing liquid is preferably 15 mass % to 35 mass %.

—Cationic Polymer—

The cationic polymer is at least any one type of a cationic polymer selected from a poly (vinyl pyridine) salt, a poly alkyl amino ethyl acrylate, a polyalkyl amino ethyl methacrylate, a poly (vinyl imidazole), a polyethylene imine, a polybiguanide, and a polyguanide.

The cationic polymer may be used as one type singly or two or more types may be used in combination.

Out of the cationic polymers, a polyguanide (preferably, a poly(hexamethylene guanidine)acetate, a polymonoguanide, a polymeric biguanide), a polyethylene imine, or a poly (vinyl pyridine) which are advantageous from the point of view of the speed of aggregation are preferable.

As the weight average molecular weight of the cationic polymer, a low molecular weight is preferable from the point of view of viscosity of the processing liquid. In a case where the processing liquid is added onto the recording medium using an ink jet method, the weight average molecular weight is preferably in a range of 500 to 500,000, is more preferably in a range of 700 to 200,000, and is even more preferably in a range of 1,000 to 100,000. When the weight average molecular weight is 500 or more, it is advantageous from the point of view of the speed of aggregation, and when 500,000 or less, it is advantageous from the point of discharge reliability. Here, there are no limitations in a case where the processing liquid is added into the recording medium with a method other than the ink jet method.

In a case where the processing liquid includes the cationic polymer, the pH of the processing liquid (25° C.) is preferably 1.0 to 10.0, is more preferably 2.0 to 9.0, and is even more preferably 3.0 to 7.0.

The content of the cationic polymer with regard to the total mass of the processing liquid is preferably 1 mass % to 35 mass % and is more preferably 5 mass % to 25 mass %.

The processing liquid preferably include at least one type of water-soluble organic solvent in addition to the flocculant. The details of the water-soluble organic solvent are the same as the ink composition and the preferable format is also the same.

The processing liquid can further contain other additives as other components in a range which does not deteriorate the effect of the present invention. Examples of the other additives include known additives such as a drying prevention agent (humectant), an anti-fading agent, an emulsion stabilizer, a penetration enhancer, an ultraviolet absorbing agent, a preservative, a fungicide, a pH adjusting agent, a surface tension adjusting agent, an anti-foaming agent, a viscosity adjusting agent, a dispersing agent, a dispersion stabilizer, an anti-rust agent, or a chelating agent.

[Image Forming Method]

The image forming method of the present invention uses the ink set of the present invention which has been described and includes a processing liquid adding step of adding the processing liquid onto the recording medium, an ink adding step of adding the black ink composition onto the recording medium, and a curing image step of curing the image by irradiating the image, which is formed by the processing liquid adding step and the ink adding step, with an active energy ray. The image forming method of the present invention may include further other configuration as required.

In the image forming method of the present invention, change in hue is suppressed and an image with further superior blocking resistance and scratch resistance can be formed by the components of the ink composition being in an aggregate state using the flocculant which is included in the processing liquid and by the polymerizing and curing of the polymerizable compound due to the irradiation of this with an active energy ray. In addition, an image with further superior adhesion to the recording medium can be formed. In addition, the image which is obtained by curing further improves film strength.

(Ink Adding Step)

The ink adding step is where the black ink composition of the present invention which has been described is added onto the recording medium using, for example, an ink jet recording method. In this step, the ink composition can be selectively added onto the recording medium and a desired image can be formed.

The ink jet recording method is not particularly limited and may be a known method, for example, any of an electric charge control method where ink is discharged using static induction, a drop-on-demand method (pressure pulse method) which uses vibration pressure of a piezo element, an acoustic ink jet method where ink is discharged using radiation pressure by changing an electric signal into an acoustic beam and irradiating the ink, a thermal ink jet method (bubble jet (registered trademark)) where bubbles are formed by heating the ink and pressure which is generated is used, or the like. Here, in the ink jet recording method, a method where there are a plurality of ejections of ink with a low concentration referred to as photo ink with a small volume, a method where image quality is improved using a plurality of inks with different concentrations with the same hue in practice, and a method where a colorless and transparent ink is used, are included.

In addition, the ink jet head which is used in the ink jet recording method may use an on-demand method or a continuous method. In addition, specific examples include an electricity-machinery conversion method (for example, a single-cavity type, a double cavity type, a bender type, a piston type, a shear mode type, a shared wall type, and the like), an electricity-thermal conversion method (for example, thermal ink jet type, a bubble jet (registered trademark) type, and the like), an electrostatic attraction method (for example, an electric field control type, a slit jet type and the like), a discharge method (for example, spark jet type, and the like) and the like, but any of the discharge methods may be used.

Here, the ink nozzle and the like which are used when performing recording by using the ink jet recording method are not particularly limited and can be appropriately selected as required.

As the ink jet recording method, there are a shuttle method where a serial head with a short length (short-length head) is used and recording is performed while the serial head scans in the width direction of the recording medium and a line method where a line head is used where recording elements are lined up to correspond to whole region on one side of the recording medium. In the line method, image recording on the whole surface of the recording medium can be performed by the recording medium being scanned in the direction which is orthogonal to the lining-up direction of the recording elements, and a transport system such as a carriage which scans the short-length heads is not necessary. In addition, since movement of the carriage and complex scanning control of the recording medium is not necessary and only the recording medium moves, the speeding up of the recording speed can be realized compared to the shuttle method. The image forming method of the present invention can be applied to either of these but the effect of improving the discharging accuracy and scratch resistance in the image is large in a general case of being applied to the line method where dummy jetting is not performed.

The liquid droplet amount of the ink which is discharged from the ink jet head is preferably 0.5 to 6 pl (picoliter), is more preferably 1 to 5 pl, and is even more preferably 2 to 4 pl from the point of view of a highly detailed image.

Processing Liquid Adding Step

The processing liquid adding step is where the processing liquid is addedonto the recording medium and an image is formed by the processing liquid coming into contact with the ink composition. In this case, the disperse particles such as the resin particles, and the pigment, and the like in the ink composition aggregate and the image is fixed onto the recording medium. Here, the details of each component and the preferable format of the processing liquid are as described above.

The addition of the processing liquid can be performed by applying a known method such as a coating method, an ink jet recording method, an immersion method, or the like. As the coating method, it is possible to be performed using a known coating method which uses a bar coater (wire bar coater and the like), an extrusion die coater, an air doctor coater, a blade coater, a rod coater, a knife coater, a squeeze coater, a reverse roll coater, or the like. The details of the ink jet recording method are as already described.

The processing liquid adding step may be provided either before or after the ink adding step which uses the ink composition.

In the present invention, a format is preferable where the ink adding step is provided after adding of the processing liquid in the processing liquid adding step. That is, a format is preferable where the processing liquid which can aggregate the pigment in the ink composition is added onto the recording medium in advance before the adding (discharging) of the ink composition using the ink jet recording method and an image is formed by discharging of the ink composition so as to come into contact with the processing liquid which has been added onto the recording medium. Due to this, the ink jet recording is sped up, and an image with high density and resolution can be obtained even with high speed recording.

As the adding amount of the processing liquid, there is no particular limitation as long as aggregation of the ink composition is possible, and preferably, it is possible for the adding amount of the aggregation agent to be an adding amount which is 0.1 g/m$^2$ or more. Out of these, the adding amount of the aggregation agent is preferably an amount which is 0.1 to 1.0 g/m$^2$ and is more preferably an amount which is 0.2 to 0.8 g/m$^2$. When the adding amount of the flocculant is 0.1 g/m$^2$ or more, the aggregation reaction progresses smoothly, and when the adding amount of the flocculant is 1.0 g/m$^2$ or less, it is preferable as the glossiness is not excessively high.

In addition, in the present invention, it is preferable to provide the ink adding step after the processing liquid adding step and further provide a heating and drying step where the processing liquid on the recording medium is heated and dried until the ink composition is added after the processing liquid is added into the recording medium. Due to the processing liquid being heated and dried in advance before the ink adding step, the ink coloration such as bleeding prevention is excellent and a visible image with excellent color density and hue can be recorded.

The heating and drying is performed using known heating means such as a heater, air blowing means using wind such as a dryer, or means where these are used in combination. Examples of the heating method include a method where heat is supplied using a heater or the like from an opposite side to surface where the processing liquid was added in the recording medium, a method where a warm air or a hot wind is blown against surface where the processing liquid was added in the recording medium, a heating method where an infrared heater is used and the like, and the heating may be performed by a plurality of combinations of these.

(Heating and Drying Step)

The image forming method of the present invention preferably has the heating and drying step where at least a portion of the solvent in the ink composition is removed by heating the ink image which is formed due to the adding of the ink composition after the ink adding step. Due to the carrying out of the heating and drying step, a superior image with adhesion and scratch resistance can be formed by the curing step which follows.

The heating method is not particularly limited but examples appropriately include a method of drying without contact such as a method of heating using a heating element such as a nichrome wire heater or the like, a method where a warm air or a hot wind is supplied, a method of heating using a halogen lamp, an infrared lamp or the like.

(Curing Step)

The curing step is a step where an image which is formed due to at least the processing liquid adding step and the ink adding step is irradiated with an active energy ray and the image is cured.

Examples of the active energy ray which is used here include an $\alpha$ ray, a $\gamma$ ray, an electron beam, an X ray, an ultraviolet ray, visible light, infrared light, and the like. Out of these, an ultraviolet (UV) ray is preferable.

Due to the curing step, the monomer component (water-soluble polymerizable component) in the image can be reliably polymerized and cured. At this time, curing of the whole image can be performed if a light source which irradiates the active energy ray is arranged to oppose the recording surface of the recording medium and the whole recording surface is irradiated. Here, the light source which irradiates the active energy ray can adopt an ultraviolet irradiation lamp, a halogen lamp, a high-pressure mercury lamp, a laser, a LED (light-emitting diode), an electron beam irradiation apparatus, and the like.

The curing step where the active energy ray is irradiated may be provided either before or after the heating and drying step or may be provided both before and after the heating and drying step as long as it is after the ink adding step and the processing liquid adding step.

The irradiation conditions of the active energy ray is not particularly limited as long as the polymerizable compound is able to be polymerized and cured. For example, the wavelength of the active energy ray is, for example, preferably 200 to 600 nm, is more preferably 300 to 450 nm, and is even more preferably 350 to 420 nm.

The output of the active energy ray is preferably 5,000 mJ/cm² or less, is more preferably 10 to 4,000 mJ/cm², and is even more preferably 20 to 3,000 mJ/cm².

—Recording Medium—

The image forming method of the present invention is where the image is recorded on the recording medium.

The recording medium is not particularly limited and typical printing paper can be used with cellulose as a main component such as so-called high-quality paper, coated paper, art paper, and the like, which is used in typical offset printing and the like. The typical printing paper with cellulose as a main component has comparatively slow absorption of ink and drying, a tendency for transfer of colorants after ejection, and a tendency for image quality to be reduced in image recording in typical ink jet recording method where aqueous ink is used, but according to the image forming method where the ink set of the present invention is used, recording of a high-quality image with superior color density and hue is possible by suppressing the transfer of colorant.

As the recording medium, the use of a typically commercially available product is possible, and examples include high quality paper (A) such as "OK Prince High Quality" manufactured by Oji Paper Co., Ltd., "Shiraoi" manufactured by Nippon Paper Industries Co., Ltd., and "New NPI High Quality" manufactured by Nippon Paper Industries Co., Ltd., lightly coated paper such as "OK Ever Light Coat" from Oji Paper Co., Ltd. and "Aurora S" manufactured by Nippon Paper Industries Co., Ltd., lightweight coated paper (A3) such as "OK Coat L" manufactured by Oji Paper Co., Ltd. and "Aurora L" manufactured by Nippon Paper Industries Co., Ltd., coated paper (A2 and B2) such as "OK Top Coat+" from Oji Paper Co., Ltd. and "Aurora Coat" manufactured by Nippon Paper Industries Co., Ltd., art paper (A1) such as "OK Kanefuji+" manufactured by Oji Paper Co., Ltd. and "Tokubishi Art" manufactured by Mitsubishi Paper Mills Limited. In addition, various types of photography paper for ink jet recording can be used.

Out of these, a recording medium where the water absorption coefficient Ka is 0.05 to 0.5 mL/m²·ms$^{1/2}$ is preferable, a recording medium of 0.1 to 0.4 mL/m²·ms$^{1/2}$ is more preferable, and a recording medium of 0.2 to 0.3 mL/m²·ms$^{1/2}$ is even more preferable from the point of view of a large effect in the suppressing of the transfer of colorants and obtaining a high quality image with excellent color density and hue above than in the related art.

The water absorption coefficient Ka has the same meaning as disclosed in JAPAN TAPPI Paper and Pulp Test Method No. 51: 2000 (issued by Japan Technical Association of the Pulp and Paper Industry), and specifically, the absorption coefficient Ka may be determined by calculating the difference between the amounts of transfer of water at a contact time of 100 ms and a contact time of 900 ms each measured using an automatic scanning liquid absorption meter KM500Win (manufactured by Kumagai Riki Kogyo Co., Ltd.).

Among the recording medium, a so-called coated paper for use in typical offset printing and the like is preferred. The coated paper is provided with a coating layer by coating a coating material on a surface of high quality paper, medium quality paper, or the like with cellulose as a main component which has not typically been surface treated. In the image forming using normal ink jet recording method with aqueous ink, it is easy for problems to occur in the coated paper in terms of product quality such as glossiness of an image or scratch resistance, but in the image recording method of the present invention, an image with excellent glossiness and scratch resistance can be obtained by suppressing the variation in glossiness. In particular, coated paper which contains base paper and a coating layer containing kaolin and/or calcium bicarbonate is preferably used. More specifically, art paper, coated paper, lightweight coated paper, or lightly coated paper is more preferred.

EXAMPLES

The invention will be specifically described using examples but the invention is not limited to the examples. Here, unless otherwise specified, "part" and "%" are based on mass.

[Synthesis of Resin Dispersing Agent P-1]

Synthesis was carried out according to the below.

A monomer supply composition was prepared by mixing methacrylic acid (172 parts), benzyl methacrylate (828 parts), and isopropanol (375 parts). The initiator supply composition was prepared by mixing 2,2-azobis (2-methyl butyronitrile) (22.05 parts) and isopropanol (187.5 parts).

Next, isopropanol (187.5 parts) was added dropwise to a mixture of the monomer supply composition and the initiator supply composition for 2 hours while being heated to 80° C. in a nitrogen atmosphere. After the completion of the dropwise adding, the mixture was maintained at 80° C. for a further 4 hours and cooled to 25° C.

After cooling, a resin dispersing agent P-1 with a weight average molecular weight of approximately 50,000 was obtained due to the solvent being removed with reduced pressure.

[Preparation of Black Ink Composition (K1)]

<Manufacturing of Black Pigment Dispersant K1>

An aqueous solution of a resin dispersing agent was prepared by neutralizing 0.8 equivalent of an amount of the methacrylic acid in the resin dispersing agent P-1 (150 parts) which was obtained as above using an aqueous solution of potassium hydroxide and by further adding ion-exchange water so that the concentration of the resin dispersing agent is 20 mass %.

The aqueous solution of resin dispersing agent (117 parts) was mixed with a carbon black pigment (Printex300 manufactured by Evonik Degussa) (52.5 parts), ion-exchange water (75.5 parts), and dipropylene glycol (105 parts), the mixture is dispersed until a desired volume average particle diameter was obtained using a beads mill (diameter of the beads is 0.1 mmφ, zirconia beads) and a resin covered black pigment particle dispersant N1 (uncross-linked dispersant) was obtained where the pigment concentration was 15 mass %.

Ultrapure water (100 parts), Denacol EX-321 (0.9 parts) and an aqueous solution of boric acid (aqueous solution with concentration of 4 mass % of boric acid, 9.9 parts) were added to the dispersant N1 (136 parts), and after reacting for 6.5 hours at 50° C., the mixture is cooled to 25° C. Furthermore, the obtained cross-linked dispersant is refined by performing ultrafiltration with adding ion-exchange water using a stirring ultra holder (manufactured by Advantec) and a ultrafiltration filter (molecular weight cutoff of 50,000, Q0500076E ultrafilter, manufactured by Advantec) so that the concentration of the dipropylene glycol in the dispersant with regard to the total mass of the pigment is 1 mass % or less. Subsequently, the refined dispersant was concentrated until the concentration of the pigment was increased to 15 mass % to obtain a black pigment dispersant K1.

In addition, 0.1 parts of the obtained black pigment dispersant K1 was mixed with 19.9 parts of ion-exchange water, and the volume average particle diameter of the secondary particles of this mixture was 130 nm when measured using a NANOTRACK particle size distribution measurement apparatus UPA-EX150 (manufactured by Nikkiso Co., Ltd.). The average primary particle diameter of the carbon black pigment in the obtained black ink dispersant K1 was measured. The measurement results are shown in Table 1.

<Preparation of Cyan Pigment Dispersant C1>

An aqueous solution of a resin dispersing agent was prepared by neutralizing 0.8 equivalent of an amount of the methacrylic acid in the resin dispersing agent P-1 (150 parts) which was obtained as above using an aqueous solution of potassium hydroxide and by further adding ion-exchange water so that the concentration of the resin dispersing agent is 20 mass %.

The aqueous solution of resin dispersing agent (117 parts) was mixed with a cyan pigment (pigment blue 15:3 manufactured by Dainichiseika Color and Chemicals Mfg. Co., Ltd.) (52.5 parts), ion-exchange water (75.5 parts), and dipropylene glycol (100 parts), the mixture is dispersed until a desired volume average particle diameter was obtained using a beads mill (diameter of the beads is 0.1 mmφ, zirconia beads) and a resin covered cyan pigment particle dispersant N2 (uncross-linked dispersant) was obtained where the pigment concentration was 15 mass %.

Ultrapure water (100 parts), Denacol EX-321 (0.9 parts) and an aqueous solution of boric acid (aqueous solution with concentration of 4 mass % of boric acid, 9.9 parts) were added to the above described dispersant N2 (136 parts), and after reacting for 6.5 hours at 50° C., the mixture is cooled to 25° C. Furthermore, the obtained cross-linked dispersant is refined by performing ultrafiltration with adding ion-exchange water using a stirring ultra holder (manufactured by Advantec) and a ultrafiltration filter (molecular weight cutoff of 50,000, Q0500076E ultrafilter, manufactured by Advantec) so that the concentration of the dipropylene glycol in the dispersant with regard to the total mass of the pigment is 1 mass % or less. Subsequently, the refined dispersant was concentrated until the concentration of the pigment was increased to 15 mass % to obtain a cyan pigment dispersant C1.

In addition, 0.1 parts of the obtained cyan pigment dispersant C1 was mixed with 19.9 parts of ion-exchange water, and the volume average particle diameter of the secondary particles was 80 nm when measured using a NANOTRACK particle size distribution measurement apparatus UPA-EX150 (manufactured by Nikkiso Co., Ltd.).

<Preparation of Magenta Pigment Dispersant M1>

An aqueous solution of a resin dispersing agent was prepared by neutralizing 0.8 equivalent of an amount of the methacrylic acid in the resin dispersing agent P-1 (150 parts) which was obtained as above using an aqueous solution of potassium hydroxide and by further adding ion-exchange water so that the concentration of the resin dispersing agent is 20 mass %.

The aqueous solution of resin dispersing agent (78.8 parts) was mixed with a magenta pigment (pigment red 122 manufactured by Dainichiseika Color and Chemicals Mfg. Co., Ltd.) (52.5 parts), ion-exchange water (106.7 parts), and dipropylene glycol (112 parts), the mixture is dispersed until a desired volume average particle diameter was obtained using a beads mill (diameter of the beads is 0.1 mmφ, zirconia beads) and a resin covered magenta pigment particle dispersant N3 (uncross-linked dispersant) was obtained where the pigment concentration was 15 mass %.

Ultrapure water (100 parts), Denacol EX-321 (0.6 parts) and an aqueous solution of boric acid (aqueous solution with concentration of 4 mass % of boric acid, 6.6 parts) were added to the dispersant N3 (136 parts), and after reacting for 6.5 hours at 50° C., the mixture is cooled to 25° C. Furthermore, the obtained cross-linked dispersant is refined by performing ultrafiltration with adding ion-exchange water using a stirring ultra holder (manufactured by Advantec) and a ultrafiltration filter (molecular weight cutoff of 50,000, Q0500076E ultrafilter, manufactured by Advantec) so that the concentration of the dipropylene glycol in the dispersant with regard to the total mass of the pigment is 1 mass % or less. Subsequently, the refined dispersant was concentrated until the concentration of the pigment was increased to 15 mass % to obtain a magenta pigment dispersant M1.[0340] In addition, 0.1 parts of the obtained magenta pigment dispersant M1 was mixed with 19.9 parts of ion-exchange water, and the volume average particle diameter of the secondary particles was 80 nm when measured using a NANOTRACK particle size distribution measurement apparatus UPA-EX150 (manufactured by Nikkiso Co., Ltd.) using this.

<Synthesis of Polymerizable Compound 2>

To a 1 L three-necked flask provided with stirrer, 40.0 g of 4,7,10-trioxa-1,13-tridecane diamine (182 mmol), 37.8 g of sodium hydrogen carbonate (450 mmol), 100 g of water, and 300 g of tetrahydrofuran were added and 35.2 g of acrylic acid chloride (389 mmol) was added dropwise thereto over 20 minutes in an ice bath. After the dropwise addition and stirring for 5 hours at room temperature, the tetrahydrofuran was removed at reduced pressure from the obtained reaction mixture. Next, the water layer was extracted 4 times using 200 ml of ethyl acetate, and after the obtained organic layer was dried using magnesium sulfate and filtered, the solvent was removed under reduced pressure to obtain solid of the desired polymerizable compound 2 (35.0 g, 107 mmol, yield of 59%).

The structure of the polymerizable compound 2 is shown below.

Polymerizable Compound 2

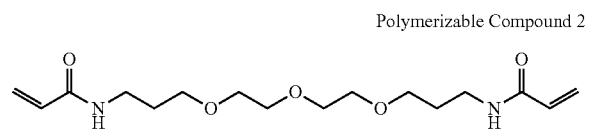 [SMILES: C=CC(=O)NCCCOCCOCCOCCCNC(=O)C=C]

<Preparation of Black Ink Composition (Ink 1)>

After the composition described below was mixed and filtered using a glass filter (GS-25) manufactured by Advantec, filtration was performed using a filter (PVDF film, hole diameter of 5 μm) manufactured by Millipore Corp. and a black ink composition (ink 1) was prepared.

~Composition of Black Ink Composition (Ink 1)~

| | |
|---|---|
| Black pigment dispersant K1 | 13.3 parts |
| Cyan pigment dispersant C1 | 2.7 parts |
| Magenta pigment dispersant M1 | 4 parts |
| Polymerizable compound 2 | 10 parts |
| Hydroxyethyl acrylamide | 10 parts |
| Olfin E1010 (surfactant manufactured by Nissin Chemical Industry Co., Ltd) | 1 part |
| Polyvinylpyrrolidone (PVP K15 manufactured by ISP Japan Ltd.) | 1 part |
| Irgacure 2959 (photopolymerization initiator manufactured by BASF Japan) | 3 parts |
| Ion-exchange water | residual so that total is 100 parts |

<Preparation of Black Ink Compositions (Ink 2 to 5 and 10 and 11)>

Black ink compositions (ink 2 to 5 and 10 and 11) were prepared in the same manner as the black ink composition (ink 1) except for the content of each of the carbon black pigment, cyan pigment and magenta pigment in the preparing the black ink composition (ink 1) being changed as in Table 1 below and the amount of ion-exchange water in the ink composition being adjusted so that all of the ink is 100 parts as necessary.

<Preparation of Black Ink Compositions (Ink 6 to 9)>

Black ink compositions (ink 6 to 9) were prepared in the same manner as the black ink composition (ink 1) except for the ratio (mass %) of the hydroxyethyl acrylamide (that is, the monofunctional polymerizable compound) with regard to the total mass of the hydroxyethyl acrylamide and the polymerizable compound 2 (that is, the total mass of the polymerizable compound) being changed as shown in Table 1 below, with the total mass of the hydroxyethyl acrylamide and the polymerizable compound 2 in the black ink composition being fixed at 20 parts, in the preparing the black ink composition (ink 1).

<Preparation of Black Ink Compositions (Ink 12 to 16)>

Black ink compositions (ink 12 to 16) were prepared in the same manner as the black ink composition (ink 1) except for the type of carbon black pigment being changed as shown in Table 1 below in the preparing the black ink composition (ink 1) (specifically, the preparing the black dispersant K1).

In Table 1, there are the carbon black pigments of NIPEX170, Special Black 5, and Printex 35 which are all manufactured by Evonik Degussa Co., Ltd and the carbon black pigments of MA100 and MA14 which are all manufactured by Mitsubishi Chemical Corp.

[Preparation of Processing Liquid]

The processing liquid was prepared by mixing the components of the composition below.

The viscosity, the surface tension, and pH (25±1° C.) of the processing liquid were a viscosity of 2.5 mPa·s, a surface tension of 40 mN/m, and a pH of 1.0.

Here, the surface tension is measured using an automatic surface tensiometer CBVP-Z manufactured by Kyowa Interface Sciences Co. Ltd. and the viscosity is measured using a DV-III Ultra CP manufactured by Brookfield Engineering Inc. The pH was measured using a pH meter HM-30R manufactured using DKK-TOA Corp.

—Composition of Processing Liquid—

| | |
|---|---|
| Malonic acid (manufactured by Wako Pure Chemical Industries, Ltd.) | 11.3% |
| DL-malic acid (manufactured by Fuso Chemical Co., Ltd.) | 14.5% |
| Tripropylene glycol monomethyl ether (manufactured by Tokyo Chemical Industry Co., Ltd.) | 4.0% |
| Diethylene glycol monobutyl ether (manufactured by Daicel Corp.) | 4.0% |
| Ion-exchange water | residual so that total is 100% |

[Image Forming and Evaluation]

<Image Forming>

A printer for evaluation which was provided with a GEL-JET GX5000 printer head (a full line head manufactured by Ricoh Company Ltd.) was prepared and the black ink composition which was obtained as above was filled into a storage tank which is linked to the printer head. "Tokubishi Art Double-Side N" manufactured by Mitsubishi Paper Mills Limited was fixed as the recording medium on a stage which can move in a predetermined linear direction at 500 mm/s and the stage temperature was maintained at 30° C. The processing liquid which was obtained as above is coated on this in an amount which is approximately 1.5 g/m$^2$ (the adding amount of the flocculant is approximately 0.387 g/m$^2$) with a wire bar coater and dried for 2 seconds at 50° C. immediately after coating.

After this, the ink jet head was arranged to be fixed so that the direction of the line head where the nozzles are lined up (main scanning direction) was at an inclination of 75.7 degree with regard to the direction which intersects with the movement direction of the stage (sub scanning direction) and a solid image was recorded by discharging the black ink composition using a line method with the discharge conditions where the ink liquid droplet amount was 3 pL, the discharge frequency was 25.5 kHz, and the resolution was 1200 dpi× 1200 dpi while the recording medium was moved at a constant speed in the sub scanning direction. After the recording of the image, the recording medium was hit with a warm airat 120° C. for 15 seconds at the droplet landing surface and 5 m/sec using an air blower while the rear side (rear surface) of the ink droplet landing surface is heated using an infrared heater. After the image drying, a printed image sample was obtained by curing the image by irradiating UV light (metal halide lamp manufactured by Eye Graphics Co. Ltd. with a maximum irradiation wavelength of 365 nm) such that the total irradiation amount became 0.8 J/cm$^2$.

<Evaluation of Scratch Resistance>

A printed image sample obtained as above was left in an environment with 50% RH at 25° C. for 15 minutes. The surface of the solid image of the printed image sample after being left was rubbed back and forth 10 times with a load of 200 kg/m$^2$ being applied by being overlapped with Tokubishi Art Double-Side N where there has been no image forming (referred to below as an unused sample in this evaluation). After this, the solid image which has been rubbed against the unused sample was visually observed and evaluated according to the following evaluation criteria.

Evaluation Criteria for Scratch Resistance

A: Adhesion of color to the unused sample was not recognized and deterioration of the solid images which were rubbed was not recognized.

B: Slight adhesion of color to the unused sample was recognized and deterioration of the solid images which were rubbed was not recognized.

C: Adhesion of color to the unused sample was recognized and a portion of the solid images which were rubbed (less than half of the solid image surface) deteriorated.

D: Adhesion of color to the unused sample was recognized and more than half of the solid images which were rubbed deteriorated.

*D is the level which is a problem in practice.

<Evaluation of Blocking Resistance>

A printed image sample obtained as above was cut into 2 cm squares, was left in an environment with 60% RH at 25° C. for 1 hour, and a sample for blocking resistance evaluation was prepared. Two of the samples for blocking resistance evaluation were prepared.

Next, the two samples for blocking resistance evaluation were overlapped so that the image portions are in contact and were left in an environment with 30% RH at 60° C. for 24 hours in a state of being in close contact with a load of 350 kg/m$^2$ being applied.

After having been left for 24 hours, the two samples for blocking resistance evaluation were peeled apart, the peeled off surface (image portion) was visually observed and evaluated blocking resistance according to the following evaluation criteria. The evaluation results are shown in Table 1.

~Evaluation Criteria of Blocking Resistance~

A: There was no sense of sticking when the two samples for blocking resistance evaluation were peeled apart and peeling of the image in the peeled surface was not recognized.

B: Peeling of the image caused by the adhesion of the image portions is recognized only in one location in the peeled surface.

C: There was a sense of sticking when the two samples for blocking resistance evaluation were peeled apart and peeling of the image caused by the adhesion of the image portions is recognized in two or more locations in the peeled surface.

D: There was a remarkable sense of sticking when the two samples for blocking resistance evaluation were peeled apart and peeling of the image caused by the adhesion of the image portions is recognized over the whole surface of the peeled surface.

<Change in Hue and Optical Density of Image>

Grey images were respectively formed from 10% to 100% halftone dot density for every 10% unit in the same manner as the image forming above except for that the halftone dot density of the image was changed in various ways.

$L^*$, $a^*$, and $b^*$ values ($L^*_1$, $a^*_1$, and $b^*_1$) for each of the obtained grey images were measured using a Spectroscan manufactured by Gretag Macbeth AG. In the same manner, $L^*$, $a^*$, and $b^*$ values ($L^*_2$, $a^*_2$, and $b^*_2$) are also measured from portions where an image is not formed.

Color differences for each of the grey image with the portions where an image is not formed ($\Delta Eab$) were each calculated from the measurement values using the following formula.

$$\Delta Eab = \{(a^*_1 - a^*_2)^2 + (b^*_1 - b^*_2)^2\}^{1/2}$$

Next, the change in $\Delta Eab$ in each of the grey images (absolute value of the difference of the maximum value and the minimum value) was determined and the change in hue of the image was evaluated according to the following evaluation criteria.

In addition, the optical densities of images (OD) were measured with regard to images where the halftone dot density is 100%.

The evaluation results of the change in hue in the image and the optical densities of images where the halftone dot density is 100% are shown in Table 1.

~Evaluation Criteria of Change in Hue of Image~

A: Change in $\Delta Eab$ was less than 2 and the change in hue was small which is favorable.

B: Change in $\Delta Eab$ was in a range of 2 or more and less than 4, which range can be permitted in practice.

C: Change in $\Delta Eab$ was in a range of 4 or more and less than 6, which range cannot be permitted in practice.

D: Change in $\Delta Eab$ was 6 or more and the change in hue was remarkable.

TABLE 1

| Ink No. | Carbon Black Pigment Type | Average Primary Particle Diameter (nm) | Content vs Total Ink Mass (mass %) | Ratio vs Mass of All Pigments (mass %) | Cyan Pigment Content vs Total Ink Mass (mass %) | Magenta Pigment Content vs Total Ink Mass (mass %) | Total Mass of All Pigments vs Total Ink Mass (mass %) | Ratio of Monofunctional Polymerizable Compound vs Total Polymerizable Compound Mass (mass %) | Change in hue | Scratch Resistance | Blocking Resistance | Optical Density (OD) | Reference |
|---|---|---|---|---|---|---|---|---|---|---|---|---|---|
| 1 | Printex 300 | 27 | 2.0 | 67 | 0.4 | 0.6 | 3.0 | 50 | A | A | A | 1.60 | Example |
| 2 | Printex 300 | 27 | 2.5 | 83 | 0.2 | 0.3 | 3.0 | 50 | C | C | C | 1.60 | Comparative Example |
| 3 | Printex 300 | 27 | 2.3 | 66 | 0.5 | 0.7 | 3.5 | 50 | A | A | A | 1.65 | Example |
| 4 | Printex 300 | 27 | 2.7 | 68 | 0.5 | 0.8 | 4.0 | 50 | A | A | B | 1.70 | Example |
| 5 | Printex 300 | 27 | 1.2 | 67 | 0.25 | 0.35 | 1.8 | 50 | A | A | A | 1.05 | Example |
| 6 | Printex 300 | 27 | 2.0 | 67 | 0.4 | 0.6 | 3.0 | 0 | A | B | A | 1.70 | Example |
| 7 | Printex 300 | 27 | 2.0 | 67 | 0.4 | 0.6 | 3.0 | 25 | A | A | A | 1.70 | Example |
| 8 | Printex 300 | 27 | 2.0 | 67 | 0.4 | 0.6 | 3.0 | 75 | A | A | A | 1.60 | Example |
| 9 | Printex 300 | 27 | 2.0 | 67 | 0.4 | 0.6 | 3.0 | 100 | B | A | B | 1.50 | Example |
| 10 | Printex 300 | 27 | 3.6 | 80 | 0.4 | 0.5 | 4.5 | 50 | C | D | D | 1.75 | Comparative Example |
| 11 | Printex 300 | 27 | 3.0 | 67 | 0.6 | 0.9 | 4.5 | 50 | C | C | C | 1.75 | Comparative Example |
| 12 | NIPEX 170 | 17 | 2.0 | 67 | 0.4 | 0.6 | 3.0 | 50 | B | C | C | 1.60 | Comparative Example |
| 13 | MA 100 | 24 | 2.0 | 67 | 0.4 | 0.6 | 3.0 | 50 | A | A | A | 1.60 | Example |
| 14 | Printex 35 | 31 | 2.0 | 67 | 0.4 | 0.6 | 3.0 | 50 | A | A | A | 1.60 | Example |
| 15 | MA 14 | 40 | 2.0 | 67 | 0.4 | 0.6 | 3.0 | 50 | C | A | C | 1.60 | Comparative Example |
| 16 | Special Black 5 | 20 | 2.0 | 67 | 0.4 | 0.6 | 3.0 | 50 | A | A | A | 1.60 | Example |

As shown in Table 1, in the examples where the average primary particle diameter of the carbon black pigments was 20 nm or more and less than 35 nm, the content ratio of the carbon black with regard to the total mass of all of the pigment was 70 mass % or less, and the total mass of all of the pigment with regard to the total mass of the black ink composition was 4 mass % or less, the change in hue was suppressed and the blocking resistance and scratch resistance were superior.

On the other hand, in the ink 2 (comparative example) and the ink 10 (comparative example) where the content ratio of the carbon black with regard to the total mass of all of the pigment exceeded 70 mass % and the ink 10 (comparative example) and the ink 11 (comparative example) where the total mass of all of the pigment with regard to the total mass of the black ink composition exceeded 4 mass %, the change in hue was large and the blocking resistance and scratch resistance were reduced.

In addition, in the ink 12 (comparative example) where the average primary particle diameter of the carbon black pigments was less than 20 nm, the blocking resistance and scratch resistance were deteriorated.

In addition, in the ink 15 (comparative example) where the average primary particle diameter of the carbon black pigments exceeded 35 nm, the change in hue was large and the blocking resistance was deteriorated.

This application claims priority under 35 U.S.C. §119 of Japanese Patent application JP 2011-186610, filed on Aug. 29, 2011, the entire contents of which are hereby incorporated by reference.

What is claimed is:

1. A black ink composition for ink jet recording comprising:
    a carbon black pigment;
    at least any one type of colorant pigment selected from a magenta pigment and a cyan pigment;
    a water-soluble polymerizable compound;
    a polymerization initiator; and
    water,
    wherein the average primary particle diameter of the carbon black pigment is 20 nm or more and less than 35 nm,
    the content ratio of the carbon black pigment with regard to the total mass of all of the pigments is 70 mass % or less, and
    the total mass of all of the pigments with regard to the total mass of the black ink composition is 4 mass % or less.
2. The black ink composition according to claim 1,
    wherein at least a portion of surface of the carbon black pigment and at least one type of the colorant pigment are covered by a resin which has a salt-forming group.
3. The black ink composition according to claim 1,
    wherein the water-soluble polymerizable compound contains a multifunctional polymerizable compound and a monofunctional polymerizable compound having a (meth)acrylamide structure.
4. The black ink composition according to claim 2,
    wherein the water-soluble polymerizable compound contains a multifunctional polymerizable compound and a monofunctional polymerizable compound having a (meth)acrylamide structure.
5. The black ink composition according to claim 3,
    wherein the content ratio of the monofunctional polymerizable compound is 20 mass % or more and 80 mass % or less with regard to the total mass of the water-soluble polymerizable compound.
6. The black ink composition according to claim 2,
    wherein the resin having salt-forming group is cross-linked by a cross-linking agent.
7. The black ink composition according to claim 2,
    wherein the resin having salt-forming group has at least one type of aromatic ring structure and alicyclic structure.
8. The black ink composition according to claim 1,
    wherein the polymerization initiator is a compound represented by the following general formula (1),

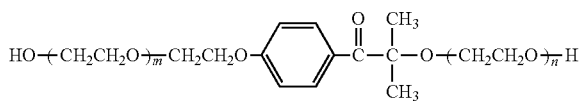

wherein, in the formula, m and n each independently represent an integer of 0 or more and m+n represents an integer of 0 to 3.
9. The black ink composition according to claim 1, further comprising:
    an acetylene glycol-based surfactant.
10. The black ink composition according to claim 1,
    wherein the total mass of all of the pigments with regard to the total mass of the black ink composition is 1.8 mass % or more.
11. The black ink composition according to claim 1,
    wherein the content ratio of the carbon black pigment with regard to the total mass of all of the pigments is 50 mass % or more.
12. An ink set for ink jet recording comprising:
    the black ink composition according to claim 1; and
    a processing liquid which includes a flocculant being able to aggregate the black ink composition by coming into contact with the black ink composition.
13. The ink set according to claim 12,
    wherein the flocculant is an acidic compound.
14. An ink set for ink jet recording comprising:
    a black ink composition containing a carbon black pigment, a magenta pigment, a cyan pigment, a water-soluble multifunctional polymerizable compound, a water-soluble monofunctional polymerizable compound having a (meth)acrylamide structure, a polymerization initiator, an acetylene glycol-based surfactant, and water;
    a processing liquid containing an acidic compound being able to aggregate the black ink composition by coming into contact with the black ink composition;
    wherein the average primary particle diameter of the carbon black pigment is 20 nm or more and less than 35 nm,
    the content ratio of the carbon black pigment with regard to the total mass of all of the pigments is 70 mass % or less,
    the total mass of all of the pigments with regard to the total mass of the black ink composition is 1.8 mass % or more to 4 mass % or less, and
    at least a portion of surface of the carbon black pigment, the magenta pigment and the cyan pigment are covered by a resin having a salt-forming group cross-linked by cross-linking agent and an aromatic ring structure.
15. An image forming method using the ink set according to claim 12 comprising:
    adding processing liquid for adding the processing liquid onto a recording medium;
    adding ink for adding the black ink composition onto the recording medium; and curing image for curing the image by irradiating active energy ray to the image formed by the adding processing liquid and the adding ink.

* * * * *